(12) United States Patent
Bell

(10) Patent No.: US 10,394,392 B2
(45) Date of Patent: Aug. 27, 2019

(54) OBJECT DETECTION AND SCAN

(71) Applicant: Atmel Corporation, San Jose, CA (US)

(72) Inventor: Thomas Bell, Hampshire (GB)

(73) Assignee: Atmel Corporation, Chandler, AZ (US)

( * ) Notice: Subject to any disclaimer, the term of this patent is extended or adjusted under 35 U.S.C. 154(b) by 128 days.

(21) Appl. No.: 14/977,348

(22) Filed: Dec. 21, 2015

(65) Prior Publication Data

US 2016/0202783 A1    Jul. 14, 2016

Related U.S. Application Data

(60) Provisional application No. 62/103,500, filed on Jan. 14, 2015.

(51) Int. Cl.
G06F 3/044 (2006.01)
G06F 3/041 (2006.01)
G06F 3/0354 (2013.01)

(52) U.S. Cl.
CPC .......... *G06F 3/044* (2013.01); *G06F 3/03545* (2013.01); *G06F 3/0416* (2013.01); *G06F 3/04166* (2019.05)

(58) Field of Classification Search
CPC .............................. G06F 3/044; G06F 3/0416
See application file for complete search history.

(56) References Cited

U.S. PATENT DOCUMENTS

| | | |
|---|---|---|
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |

(Continued)

FOREIGN PATENT DOCUMENTS

WO   WO 2012/129247 A2   9/2012

OTHER PUBLICATIONS

Katsurahira, Foreign Priority Document for Application No. JP 2015-000850, "Position Detection Device," Jan. 6, 2015, pp. 1-31.*

(Continued)

*Primary Examiner* — Amr A Awad
*Assistant Examiner* — Maheen I Javed
(74) *Attorney, Agent, or Firm* — Baker Botts L.L.P.

(57) ABSTRACT

In certain embodiments, a method includes determining a position of an input within a touch-sensitive area of a touch sensor. The touch sensor includes a first number of electrodes having a first orientation and a second number of electrodes having a second orientation. The second orientation is different from the first orientation. The method also includes selecting a first set of the first number of electrodes and a first set of the second number of electrodes such that the determined position of the input is within an overlap of the first set of the first number of electrodes with the first set of the second number of electrodes. An area of the overlap is smaller than the touch-sensitive area.

17 Claims, 20 Drawing Sheets

(56) References Cited

U.S. PATENT DOCUMENTS

| | | | |
|---|---|---|---|
| 8,723,824 B2 | 5/2014 | Myers | |
| 2008/0309635 A1 | 12/2008 | Matsuo | |
| 2009/0315854 A1 | 12/2009 | Matsuo | |
| 2010/0283752 A1 | 11/2010 | Maeda | |
| 2011/0115717 A1 | 5/2011 | Hable | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0063375 A1* | 3/2013 | Yoshida | G06F 3/0416 345/173 |
| 2013/0076612 A1 | 3/2013 | Myers | |
| 2013/0265282 A1 | 10/2013 | Nakagawa | |
| 2014/0049705 A1 | 2/2014 | Sugita | |
| 2014/0292704 A1 | 10/2014 | Cleary | |
| 2014/0347076 A1* | 11/2014 | Barton | G06F 3/0488 324/663 |
| 2015/0035768 A1* | 2/2015 | Shahparnia | G06F 3/041 345/173 |
| 2015/0301631 A1* | 10/2015 | Mirfakhraei | G06F 3/044 345/173 |
| 2016/0188085 A1* | 6/2016 | Leigh | G06F 3/0416 345/174 |
| 2017/0269776 A1* | 9/2017 | Katsurahira | G06F 3/0416 |

OTHER PUBLICATIONS

International Search Report and Written Opinion for International Application PCT/US2016/013242, dated Jul. 1, 2016.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
U.S. Appl. No. 14/978,286, filed Dec. 22, 2015, Bell.
U.S. Appl. No. 14/978,332, filed Dec. 22, 2015, Bell.

* cited by examiner

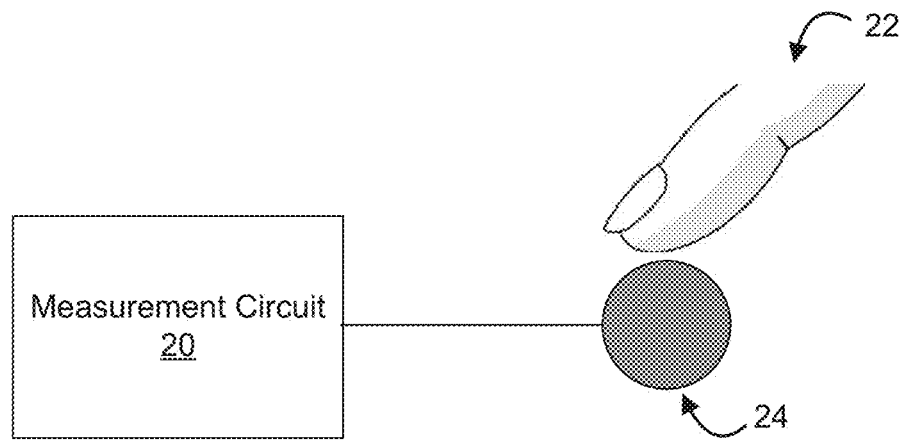
Figure 2A
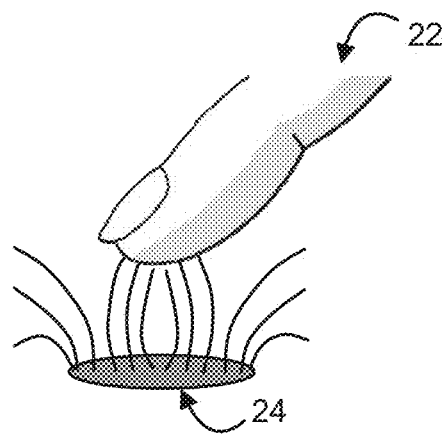
Figure 2B
*FIG. 2*

OBJECT DETECTION AND SCAN

RELATED APPLICATIONS

This application claims the benefit, under 35 U.S.C. § 119(e), of U.S. Provisional Patent Application Ser. No. 62/103,500, filed Jan. 14, 2015, the entirety of which is incorporated herein by reference.

TECHNICAL FIELD

This disclosure generally relates to touch sensors.

BACKGROUND

A touch sensor detects the presence and position of a touch or the proximity of an object (such as a user's finger or a stylus) within a touch-sensitive area of a touch sensor array overlaid on a display screen, for example. A touch sensor may be attached to or provided as part of a number of different devices, such as, for example, a desktop computer, laptop computer, tablet computer, personal digital assistant (PDA), smartphone, satellite navigation device, portable media player, portable game console, kiosk computer, point-of-sale device. To further illustrate, one example provides that a control panel of a household or other appliance includes a touch sensor.

There are a number of different types of touch sensors, such as (for example) resistive touch screens, surface acoustic wave touch screens, and capacitive touch screens. When an object touches the surface of touch sensor array, a change in capacitance occurs within the touch screen at the position of the touch or proximity. A touch sensor controller processes the change in capacitance to determine its position on the touch screen.

BRIEF DESCRIPTION OF THE DRAWINGS

FIGS. 2A-B illustrate an example self-capacitance measurement in accordance with an embodiment.

DESCRIPTION OF EXAMPLE EMBODIMENTS

Figure 1:
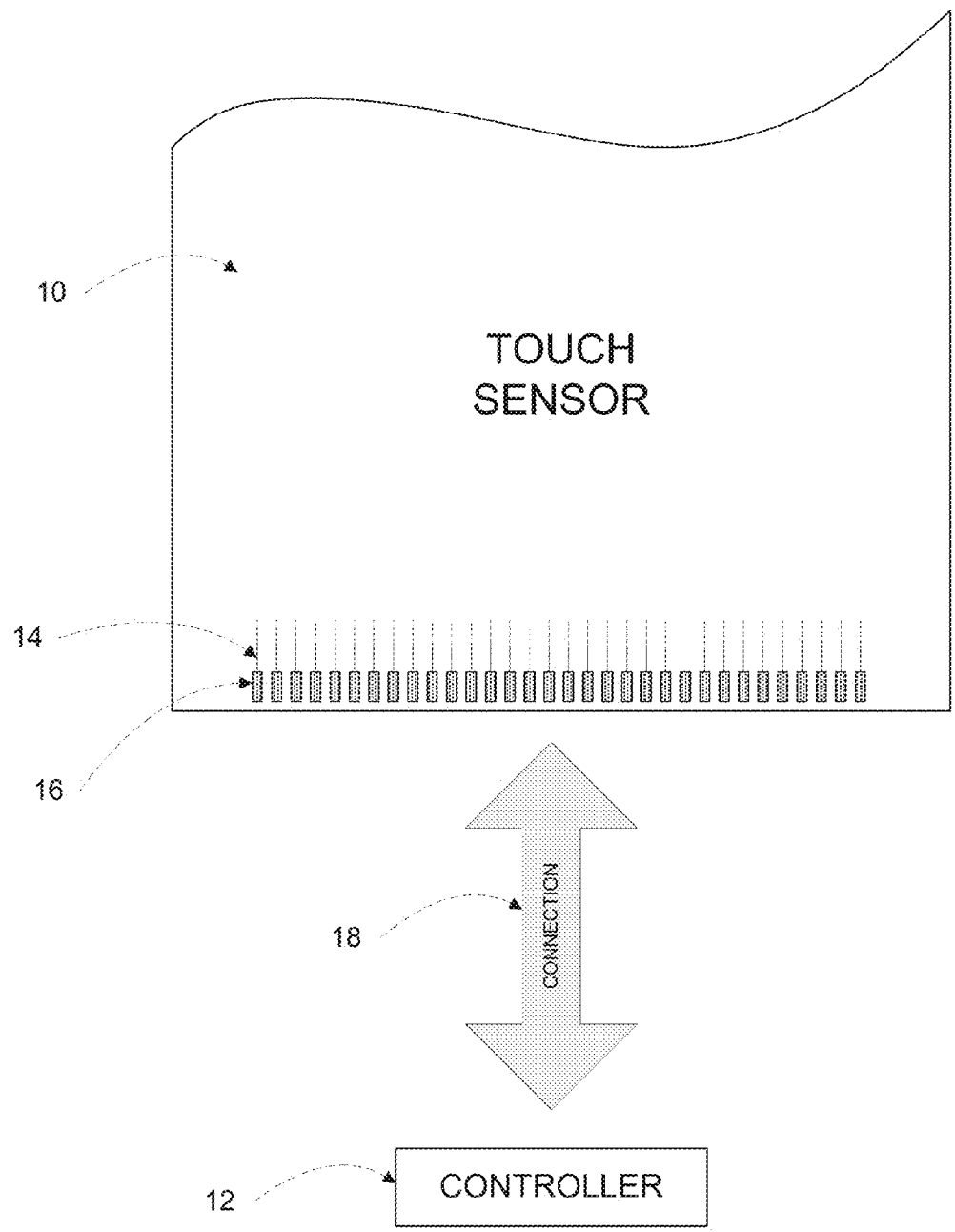
FIG. 1 illustrates an example touch sensor array with an example touch-sensor controller in accordance with an embodiment.

FIG. 1 illustrates an example touch sensor array with an example touch-sensor controller in accordance with an embodiment. Touch sensor 10 and touch-sensor controller 12 detect the presence and position of a touch or the proximity of an object within a touch-sensitive area of touch sensor array 10. Touch sensor array 10 includes one or more touch-sensitive areas. Touch sensor array 10 includes an array of electrodes disposed on one or more substrates, which is made of a dielectric material. Herein, reference to a touch sensor array encompasses both the electrodes of touch sensor 10 and the substrate(s) that they are disposed on.

An electrode is an area of conductive material forming a shape, such as for example a disc, square, rectangle, thin line, other suitable shape, or suitable combination of these. One or more cuts in one or more layers of conductive material (at least in part) creates the shape of an electrode, and the area of the shape may (at least in part) be bounded by those cuts. In one embodiment, the conductive material of an electrode occupies approximately 100% of the area of its shape. For example, an electrode is made of indium tin oxide (ITO) and the ITO of the electrode occupies approximately 100% of the area of its shape (sometimes referred to as 100% fill). In one embodiment, the conductive material of an electrode occupies substantially less than 100% of the area of its shape. For example, an electrode is made of fine lines of metal or other conductive material (FLM), such as for example copper, silver, or a copper- or silver-based material, and the fine lines of conductive material occupies approximately 5% of the area of its shape in a hatched, mesh, or other suitable pattern. Although this disclosure describes or illustrates particular electrodes made of particular conductive material forming particular shapes with particular fill percentages having particular patterns, it is noted that the present technology is not limited to these example patterns, and that other electrode patterns may be implemented.

The shapes of the electrodes (or other elements) of a touch sensor 10 constitutes, in whole or in part, one or more macro-features of touch sensor 10. One or more characteristics of the implementation of those shapes (such as, for example, the conductive materials, fills, or patterns within the shapes) constitutes in whole or in part one or more micro-features of touch sensor 10. One or more macro-features of a touch sensor 10 determines one or more characteristics of its functionality, and one or more micro-features of touch sensor 10 determines one or more optical features of touch sensor 10, such as transmittance, refraction, or reflection.

A mechanical stack contains the substrate (or multiple substrates) and the conductive material forming the electrodes of touch sensor array 10. For example, the mechanical stack includes a first layer of optically clear adhesive (OCA) beneath a cover panel. The cover panel is clear and made of a resilient material suitable for repeated touching, such as for example glass, polycarbonate, or poly(methyl methacrylate) (PMMA). This disclosure contemplates any suitable cover panel made of any suitable material. The first layer of OCA is disposed between the cover panel and the substrate with the conductive material forming the electrodes. The mechanical stack includes a second layer of OCA and a dielectric layer (which is made of PET or another suitable material, similar to the substrate with the conductive material forming the electrodes). As an alternative, a thin coating of a dielectric material is applied instead of the second layer of OCA and the dielectric layer. The second layer of OCA is disposed between the substrate with the conductive material making up the electrodes and the dielectric layer, and the dielectric layer is disposed between the second layer of OCA and an air gap to a display of a device including touch sensor array 10 and touch-sensor controller 12. For example, the cover panel has a thickness of approximately 1 millimeter (mm); the first layer of OCA has a thickness of approximately 0.05 mm; the substrate with the conductive material forming the electrodes has a thickness of approximately 0.05 mm; the second layer of OCA has a thickness of approximately 0.05 mm; and the dielectric layer has a thickness of approximately 0.05 mm. Although this disclosure describes a particular mechanical stack with a particular number of particular layers made of particular materials and having particular thicknesses, it is noted that the present technology is not limited to these example embodiments, and that other configurations may be implemented. For example, in one embodiment, a layer of adhesive or dielectric replaces the dielectric layer, second layer of OCA, and air gap described above, with there being no air gap in the display.

One or more portions of the substrate of touch sensor array 10 is made of polyethylene terephthalate (PET) or other suitable material. This disclosure contemplates any suitable substrate with any suitable portions made of any suitable material. In one embodiment, the electrodes in touch sensor array 10 is made of ITO in whole or in part. In one embodiment, the electrodes in touch sensor array 10 is made of fine lines of metal or other conductive material. For example, one or more portions of the conductive material is copper or copper-based and have a thickness of approximately 5 microns ($\mu$m) or less and a width of approximately 10 $\mu$m or less. As another example, one or more portions of the conductive material is silver or silver-based and similarly have a thickness of approximately 5 $\mu$m or less and a width of approximately 10 $\mu$m or less. It is noted that the present technology is not limited to these example electrodes.

Touch sensor 10 may implement a capacitive form of touch sensing. In a mutual-capacitance implementation, touch sensor 10 includes an array of drive and sense electrodes forming an array of capacitive nodes. A drive electrode and a sense electrode forms a capacitive node. The drive and sense electrodes forming the capacitive node comes near each other, but does not make electrical contact with each other. Instead, the drive and sense electrodes is capacitively coupled to each other across a space between them. A pulsed or alternating voltage applied to the drive electrode (by touch-sensor controller 12) induces a charge on the sense electrode, and the amount of charge induced is susceptible to external influence (such as a touch or the proximity of an object). When an object touches or comes within proximity of the capacitive node, a change in capacitance occurs at the capacitive node and touch-sensor controller 12 measures the change in capacitance. By measuring changes in capacitance throughout the array, touch-sensor controller 12 determines the position of the touch or proximity within touch-sensitive area 54(s) of touch sensor 10.

In a self-capacitance implementation, touch sensor 10 includes an array of electrodes of a single type that each forms a capacitive node. When an object touches or comes within proximity of the capacitive node, a change in self-capacitance occurs at the capacitive node and touch-sensor controller 12 measures the change in capacitance, for example, as a change in the amount of charge implemented to raise the voltage at the capacitive node by a pre-determined amount. As with a mutual-capacitance implementation, by measuring changes in capacitance throughout the array, touch-sensor controller 12 determines the position of the touch or proximity within touch-sensitive area 54(s) of touch sensor 10. This disclosure contemplates any suitable form of capacitive touch sensing.

In one embodiment, one or more drive electrodes form a drive line running horizontally or vertically or in any suitable orientation. Similarly, one or more sense electrodes form a sense line running horizontally or vertically or in any suitable orientation. In one embodiment, drive lines run substantially perpendicular to the sense lines. Herein, reference to a drive line encompasses one or more drive electrodes making up the drive line, and vice versa. Similarly, reference to a sense line encompasses one or more sense electrodes making up the sense line, and vice versa.

Touch sensor 10 has drive and sense electrodes disposed in a pattern on one side of a single substrate. In such a configuration, a pair of drive and sense electrodes capacitively coupled to each other across a space between them forms a capacitive node. For a self-capacitance implementation, electrodes of a single type are disposed in a pattern on a single substrate. In addition or as an alternative to having drive and sense electrodes disposed in a pattern on one side of a single substrate, touch sensor 10 has drive electrodes disposed in a pattern on one side of a substrate and sense electrodes disposed in a pattern on another side of the substrate. Moreover, touch sensor 10 has drive electrodes disposed in a pattern on one side of one substrate and sense electrodes disposed in a pattern on one side of another substrate. In such configurations, an intersection of a drive electrode and a sense electrode forms a capacitive node. Such an intersection is a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes a number of example electrodes, it is noted that the present technology is not limited to these example electrodes, and that other electrodes may be implemented. Additionally, although this disclosure describes a number of example embodiments that include particular configurations of particular electrodes forming particular nodes, it is noted that the present technology is not limited to these example embodiments, and that other configurations may be implemented. Additionally, although this disclosure describes a number of example embodiments that include particular configurations of particular electrodes forming particular nodes, it is noted that the present technology is not limited to these example embodiments, and that other configurations may be implemented.

As described above, a change in capacitance at a capacitive node of touch sensor 10 indicates a touch or proximity input at the position of the capacitive node. Touch-sensor controller 12 detects and processes the change in capacitance to determine the presence and position of the touch or proximity input. Touch-sensor controller 12 then communicates information about the touch or proximity input to one or more other components (such as one or more central processing units (CPUs)) of a device that includes touch sensor 10 and touch-sensor controller 12, which responds to the touch or proximity input by initiating a function of the device (or an application running on the device). Although this disclosure describes a particular touch-sensor controller having particular functionality with respect to a particular device and a particular touch sensor, it is noted that the present technology is not limited to these example controllers.

Touch-sensor controller 12 is one or more integrated circuits (ICs), such as for example general-purpose microprocessors, microcontrollers, programmable logic devices or arrays, application-specific ICs (ASICs). In one embodiment, touch-sensor controller 12 comprises analog circuitry, digital logic, and digital non-volatile memory. In one embodiment, touch-sensor controller 12 is disposed on a flexible printed circuit (FPC) bonded to the substrate of touch sensor 10, as described below. The FPC is active or passive. In one embodiment, multiple touch-sensor controllers 12 are disposed on the FPC. Touch-sensor controller 12 includes a processor unit, a drive unit, a sense unit, and a storage unit. The drive unit supplies drive signals to the drive electrodes of touch sensor 10. The sense unit senses charge at the capacitive nodes of touch sensor 10 and provide measurement signals to the processor unit representing capacitances at the capacitive nodes. The processor unit controls the supply of drive signals to the drive electrodes by the drive unit and process measurement signals from the sense unit to detect and process the presence and position of a touch or proximity input within touch-sensitive area 54(s) of touch sensor 10. The processor unit also tracks changes in the position of a touch or proximity input within touch-sensitive area 54(s) of touch sensor 10. The storage unit stores programming for execution by the processor unit, including programming for controlling the drive unit to supply drive signals to the drive electrodes, programming for processing measurement signals from the sense unit, and other suitable programming. Although this disclosure describes a particular touch-sensor controller having a particular implementation with particular components, it is noted that the present technology is not limited to these example controllers.

Tracks 14 of conductive material disposed on the substrate of touch sensor 10 couples the drive or sense electrodes of touch sensor 10 to connection pads 16, also disposed on the substrate of touch sensor 10. As described below, connection pads 16 facilitate coupling of tracks 14 to touch-sensor controller 12. Tracks 14 extend into or around (e.g., at the edges of) touch-sensitive area 54(s) of touch sensor 10. Particular tracks 14 provide drive connections for coupling touch-sensor controller 12 to drive electrodes of touch sensor 10, through which the drive unit of touch-sensor controller 12 supplies drive signals to the drive electrodes. Other tracks 14 provide sense connections for coupling touch-sensor controller 12 to sense electrodes of touch sensor 10, through which the sense unit of touch-sensor controller 12 senses charge at the capacitive nodes of touch sensor 10. Tracks 14 are made of fine lines of metal or other conductive material. For example, the conductive material of tracks 14 is copper or copper-based and have a width of approximately 100 μm or less. As another example, the conductive material of tracks 14 is silver or silver-based and have a width of approximately 100 μm or less. In one embodiment, tracks 14 are made of ITO in whole or in part in addition or as an alternative to the fine lines of metal or other conductive material. Although this disclosure describes particular tracks made of particular materials with particular widths, it is noted that the present technology is not limited to these example tracks. In addition to tracks 14, touch sensor 10 includes one or more ground lines terminating at a ground connector (which is a connection pad 16) at an edge of the substrate of touch sensor 10 (similar to tracks 14).

Connection pads 16 are located along one or more edges of the substrate, outside touch-sensitive area 54(s) of touch sensor 10. As described above, touch-sensor controller 12 is on an FPC. Connection pads 16 are made of the same material as tracks 14 and are bonded to the FPC using an anisotropic conductive film (ACF). Connection 18 includes conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 are connected to an electro-mechanical connector (such as a zero insertion force wire-to-board connector); in this embodiment, connection 18 need not include an FPC. It is noted that the present technology is not limited to these example connections.

FIGS. 2A-B illustrate an example self-capacitance measurement in accordance with an embodiment. In the example of FIG. 2A, an electrode 24 of touch sensor 10 is coupled to a measurement circuit 20. As described below, electrode 24 forms a capacitance to ground that is distributed in free space. In one embodiment, the capacitance to ground includes multiple elements, such as for example, capacitance of the tracks in the silicon, tracks on the printed circuit board (PCB), electrodes 24 made of conductive material (ITO, copper mesh, etc.), or an object 22 providing an input to electrodes 24. For example, object 22 is part of a human body, e.g., finger or palm, or a stylus. Electrode 24 has capacitive coupling to ground through the surrounding objects that are galvanically or capacitively connected to ground. As described above, measurement circuit 20 of touch-sensor controller 12 transmits a drive signal and senses a signal indicative of a touch or proximity input from object 22, such as for example a finger, through electrode 24. In one embodiment, measurement circuit 20 of touch-sensor controller 12 generates the drive signal transmitted by electrode 24 and senses the capacitance to ground. The capacitance of the surrounding material includes at least in part, the capacitance between electrode 24 and ground with object 22 providing the touch or proximity input. For example, the capacitance provided by object 22 providing the touch or proximity input adds 5-10% of the capacitance sensed by electrode 24.

In the example of FIG. 2B, the signal transmitted by electrode 24 generates an electric field that emanates from electrode 24 to a signal ground of touch sensor 10. The signal ground is galvanically or capacitively coupled to ground. The presence of an object 22, such as for example finger, affects the electric field and in turn the amount of charge sensed at electrode 24 by measurement circuit 20. As object 22 approaches electrode 24, the capacitance between electrode 24 and ground detected by measurement circuit 20 increases. In one embodiment, the increase of the capacitance between electrode 24 and ground is measured by measurement circuit 20 as a decrease of voltage at the capacitance between electrode 24 and ground. In one embodiment, measurement circuit 20 is alternately toggled between the drive and sense electrodes of a touch sensor in a mutual capacitance configuration. Although this disclosure describes the measurement circuit being integrated with a touch-sensor controller, it is noted that the present technology is not limited to these embodiments.

Figure 3:
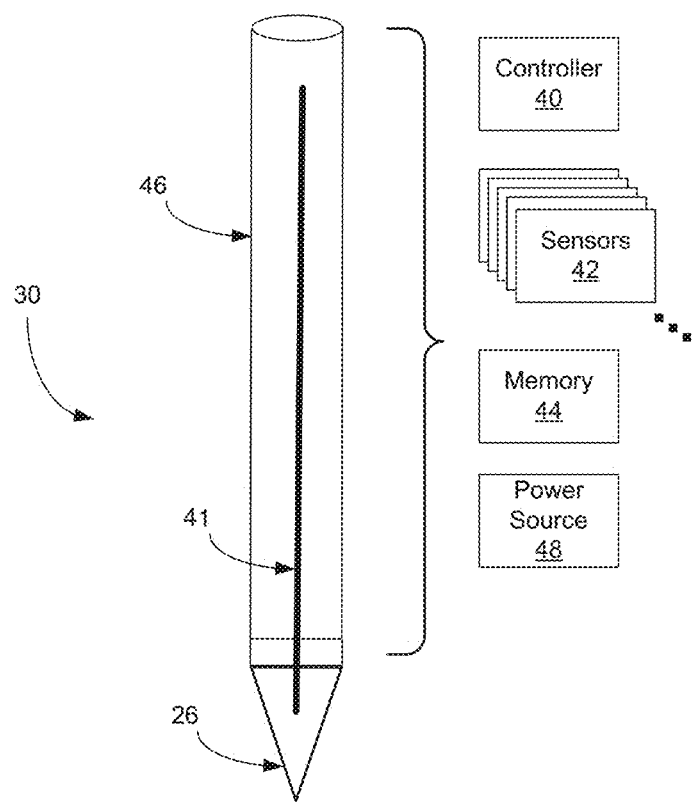
FIG. 3 illustrates example components of an active stylus in accordance with an embodiment.

FIG. 3 illustrates example components of an active stylus in accordance with an embodiment. Active stylus 30 includes one or more components, such as a controller 40, sensors 42, memory 44, or power source 48. In one embodiment, one or more components is configured to provide for interaction between active stylus 30 and a user or between a device and a user. In other one embodiment, one or more internal components, in conjunction with one or more external components described above, is configured to provide interaction between active stylus 30 and a user or between a device and a user. For example, interactions may include communication between active stylus 30 and a device, enabling or altering functionality of active stylus 30 or a device, or providing feedback to or accepting input from one or more users. As another example, active stylus 30 may communicate over an energy data transmission or modulation link, such as, for example, through a radio frequency (RF) communication link. In this case, active stylus 30 includes a RF device for transmitting data over the RF link.

Controller 40 is a microcontroller or any other type of processor suitable for controlling the operation of active stylus 30. Controller 40 is one or more ICs—such as, for example, general-purpose microprocessors, microcontrollers, PLDs, PLAs, or ASICs. Controller 40 includes a processor unit, a drive unit, a sense unit, and a storage unit. The drive unit supplies signals to electrodes of tip 26 through center shaft 41. The drive unit also supplies signals to control or drive sensors 42 or one or more external components of active stylus 30. In one embodiment, the drive unit of active stylus 30 is configured to continuously transmit a signal that is detected by electrodes of touch sensor 10. For example, the drive unit of active stylus 30 may include a voltage pump, an oscillator, or a switch, such that the voltage pump generates a voltage signal, the oscillator generates a waveform such as a square wave or a sine wave, or the switch toggles the potential of tip 26 between zero voltage and a maximum voltage. The drive unit of active stylus 30 transmits a signal, such as a square wave or sine wave, that is sensed by the electrodes.

The sense unit senses signals received by electrodes of tip 26 through center shaft 41 and provide measurement signals to the processor unit representing input from a device. The sense unit also senses signals generated by sensors 42 or one or more external components and provide measurement signals to the processor unit representing input from a user.

The processor unit controls the supply of signals to the electrodes of tip 26 and process measurement signals from the sense unit to detect and process input from the device. The processor unit also processes measurement signals from sensors 42 or one or more external components. The storage unit stores programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 30 or the device, and other suitable programming. For example, programming executed by controller 40 electronically filters signals received from the sense unit. Although this disclosure describes a particular controller 40 having a particular implementation with particular components, it is noted that the present technology is not limited to these example components.

In one embodiment, active stylus 30 includes one or more sensors 42, such as touch sensors, gyroscopes, accelerometers, contact sensors, or any other type of sensor that detects or measures data about the environment in which active stylus 30 operates. Sensors 42 detect and measure one or more characteristic of active stylus 30, such as acceleration or movement, orientation, contact, pressure on outer body 46, force on tip 26, vibration, or any other suitable characteristic of active stylus 30. For example, sensors 42 is implemented mechanically, electronically, or capacitively. As described above, data detected or measured by sensors 42 communicated to controller 40 initiates a pre-determined function or gesture to be performed by active stylus 30 or the device. In one embodiment, data detected or received by sensors 42 is stored in memory 44. Memory 44 is any form of memory suitable for storing data in active stylus 30. In one embodiment, controller 40 accesses data stored in memory 44. For example, memory 44 stores programming for execution by the processor unit of controller 40. As another example, data measured by sensors 42 is processed by controller 40 and stored in memory 44.

Power source 48 is any type of stored-energy source, including electrical or chemical-energy sources, suitable for powering the operation of active stylus 30. In one embodiment, power source 48 is charged with energy from a user or device. For example, power source 48 is a rechargeable battery that is charged by motion induced on active stylus 30. In other one embodiment, power source 48 of active stylus 30 provides power to or receive power from the device or other external power source. For example, power is inductively transferred between power source 48 and a power source of the device or other external power source, such as a wireless power transmitter. Power source 48 is also powered by a wired connection through an applicable port coupled to a suitable power source.

Figure 4:
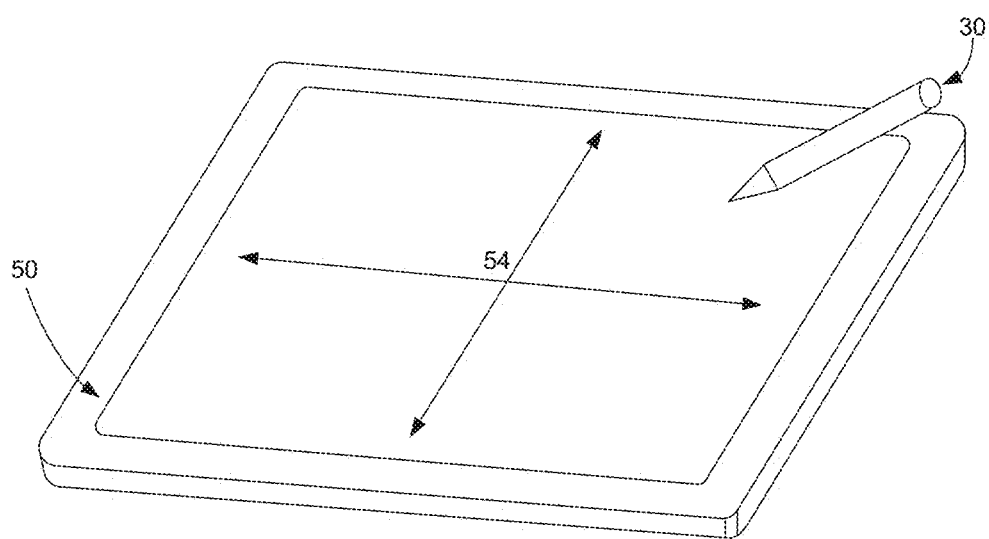
FIG. 4 illustrates an example stylus input to a device in accordance with an embodiment.

FIG. 4 illustrates an example stylus input to a device. Device 50 may have a display (not shown) and a touch sensor 10 with a touch-sensitive area 54 in accordance with an embodiment. Device 50 display is a liquid crystal display (LCD), a LED display, a LED-backlight LCD, an active-matrix organic LED (AMOLED), or other suitable display and is visible though a cover panel and substrate (and the drive and sense electrodes of touch sensor 10 disposed on it) of device 50. Although this disclosure describes a particular device display and particular display types, it is noted that the present technology is not limited to these example embodiments, and that other configurations may be implemented.

Device 50 electronics may provide the functionality of device 50. For example, device 50 electronics includes circuitry or other electronics for wireless communication to or from device 50, execute programming on device 50, generating graphical or other user interfaces (UIs) for device 50 display to display to a user, managing power to device 50 from a battery or other power source, taking still pictures, recording video, other suitable functionality, or any suitable combination of these. Although this disclosure describes particular device electronics providing particular functionality of a particular device, it is noted that the present technology is not limited to these example functionalities.

Touch-sensor controller 12 of device 50 operates in one or more modes. In one embodiment, with respect to object interaction, touch-sensor controller 12 operates in at least the following two modes: "object not detected" and "object detected." In the "object not detected" mode, touch-sensor controller 12 interleaves self-capacitance, mutual capacitance, and active stylus 30 "not detected" mode measurements to detect touch or proximity inputs, including, for example, the presence of active stylus 30 during the same measurement cycle. Each of these types of measurements is used to detect certain types of inputs performed on or above touch-sensitive area 54. For example, touch-sensor controller 12 uses self-capacitance measurements to detect certain touch or proximity inputs. In one embodiment, touch-sensor controller 12 uses self-capacitance measurements to detect single-finger touches or large area palm touches. As another example, touch-sensor controller 12 uses mutual capacitance measurements to detect certain touch or proximity inputs. In one embodiment, touch-sensor controller 12 uses mutual capacitance measurements to detect multiple small touches or multi-touch input. As described below, touch-sensor controller 12 makes the "object not detected" measurements using a modified self-capacitance measurement configured to provide position data of active stylus 30 above touch-sensitive area 54; however, it is noted that the present technology is not limited to these example techniques, and that other techniques may be implemented.

Although particular measurement types are described as being used to detect particular types of touch or proximity inputs, it is noted that the present technology is not limited to these example inputs. For example, the present disclosure contemplates using any of the above-described measurement types to detect any suitable type of touch or proximity input. As used herein, the terms "touch" and "proximity" are used interchangeably to refer to both physical touches (e.g., of touch sensor 10 or a cover layer overlaying touch sensor 10) by an object (e.g., a finger, palm, stylus, or other suitable object) and presence of an object (e.g., a finger, palm, stylus, or other suitable object) within a detectable range of touch sensor 10 where the object does not necessarily physically contact touch sensor 10 (or a cover layer overlaying touch sensor 10). For example, a touch or proximity input refers to an input where an object is in physical contact with the cover panel of a device. Additionally or alternatively, a touch or proximity input refers to detecting an object within a particular distance (e.g., hovering) over the cover panel (e.g., hovering).

In one embodiment, when touch-sensor controller of device 50 has detected active stylus 30 within touch-sensitive area 54, touch-sensor controller 12 enters (or remains in) the "object detected" mode. In the "object detected" mode, touch-sensor controller 12 discontinues some measurements (e.g., self-capacitance and mutual capacitance) and performs measurements specific to communicating with active stylus 30. In one embodiment, the "object detected" mode uses a communication scheme between active stylus 30 and device 50 that includes a synchronization phase and a listen phase. For example, in the synchronization phase active stylus 30 is synchronized to device 50 prior to the communication of other data between active stylus 30 and device 50. In one embodiment, this synchronization is performed through a synchronization ("sync") signal transmitted by the electrodes of touch-sensitive area 54 to active stylus 30. In certain embodiments, the synchronization signal comprises a pre-determined bit sequence, e.g., a pulse wave. For example, the synchronization signal is a square wave, sine wave, or any suitable voltage waveform.

In one embodiment, in the listen phase, active stylus 30 detects the synchronization signal and active stylus 30 responds with a communication signal (e.g., a series of pulses) onto which data is encoded. For example, touch-sensor controller 12 uses sample integrators connected to electrodes of touch-sensitive area 54 at pre-determined time intervals that correspond to the frequency of the synchronization signal. In one embodiment, the synchronization signal initiates, provides for, or terminates the communication signal between active stylus 30 and one or more devices 50 or one or more users.

When the housing of device 50 is in contact with the user, the electrodes of device 50 are capacitively coupled to the hand that is contact with device 50. The magnitude of the coupling is determined by the area and proximity of the user's hand to device 50. An object, such as a finger or stylus, in proximity to the electrodes defining touch-sensitive area 54 initiates a transfer of an amount of charge between the object and the electrodes of device 50. Given the user is holding the outer body of active stylus 30, which is coupled to a local ground of active stylus 30, the user couples a signal (e.g., a synchronization signal) transmitted by device 50 to the local ground of active stylus 30. This capacitive coupling reduces or inverts the signal referenced to the local ground of active stylus 30. For example, if the user places a large area touch (e.g., through a palm touch) located above the electrodes of touch sensor 10 that receive the applied signal, the applied signal is coupled into the local ground of active stylus 30 through the user holding device 50.

As described above, the sense unit of active stylus 30 is capacitively coupled to the electrodes of touch sensor 10, such that the sense unit of active stylus 30 receives a differential (e.g., the edges) of the applied signal transmitted by the electrodes of touch-sensor 10. The amplitude of the applied signal received by the sense unit of active stylus 30 depends on any suitable combination of the amplitude of the applied signal, the coupling between the electrodes, and the slew rate of the edges of the applied signal. Furthermore, a large area touch within touch-sensitive area 54 of touch sensor 10 creates capacitive loading on the electrodes of touch sensor 10 that alters the applied signal received by active stylus 30. For example, the capacitive loading from a large area touch within touch-sensitive area 54 reduces the slew rate of the edges of the applied signal. In some instances, the capacitive coupling of the signal through the user is reduced by excluding electrodes underneath a touch input from receiving the signal and transmitting the signal using the remaining electrodes.

FIGS. 5-8 illustrate an example pattern for applying voltages to electrodes 24A and 24B of touch sensor 10 to search for an object in accordance with an embodiment. For example, FIGS. 5-8 illustrate example object detection bias patterns. In the illustrated example, the pattern includes transitioning areas of touch sensor 10 through four states (shown in FIGS. 5-8, respectively); however, it is noted that the present technology is not limited to these example patterns. Additionally, although described as a pattern, it is noted that the present technology is not limited to these example patterns, and that other patterns may be implemented.

As described above, touch sensor 10 includes a set of electrodes 24A-B arrayed in a first orientation and another set of electrodes 24A-B arrayed in a second orientation, such that touch-sensitive area 54 of touch sensor 10 is defined by the two-dimensional array of electrodes 24A-B. Electrodes 24A-B are described based on their orientation in touch sensor 10. For example, electrodes oriented along a horizontal direction (e.g., x-axis) is referred to as x-electrodes and electrodes oriented along a vertical direction (e.g., y-axis) is referred to as y-electrodes. Although this disclosure describes a touch sensor including electrodes having particular orientations, it is noted that the present technology is not limited to these example orientations, and other orientations may be implemented.

As described above, in the "object not detected" mode, touch-sensor controller 12 performs a modified self-capacitance measurement to determine the position of an object, such as for example an active stylus or a portion of a human hand of the user, within touch-sensitive area 54 defined by electrodes 24A-B. Touch-sensor controller 12 drives a set 106A of one or more electrodes 24A of touch sensor 10 to transmit the applied signal, e.g., synchronization signal, to search for an object (e.g., active stylus 30) in proximity to touch sensor 10. The position of active stylus 30 is determined by transmitting a synchronization signal to active stylus 30 and "listening," such as described herein with reference to a listen phase, for a signal transmitted by active stylus 30 in response to active stylus 30 receiving the synchronization signal. In one embodiment, touch-sensor controller 12 applies the synchronization signal to set 106A of one or more electrodes 24A, and applies a voltage (e.g., a low voltage) to set 106B of one or electrodes 24B. For example, the signal applied to set 106A of electrodes 24A includes a number of pulses that have an amplitude that corresponds to a pre-determined peak voltage, such as a supply voltage. As another example, the low voltage applied to set 106B of electrodes 24B is ground or any reference voltage. In one embodiment, reference to a "high" bias refers to applying a signal of any voltage above the reference voltage to the electrodes, while reference to "low" bias refers to applying a reference voltage (e.g., ground) to electrodes. Although this disclosure describes techniques for locating and synchronizing with an active stylus using particular voltage values, it is noted that the present technology is not limited to these example embodiments, and other example embodiments may be implemented.

Figure 5:
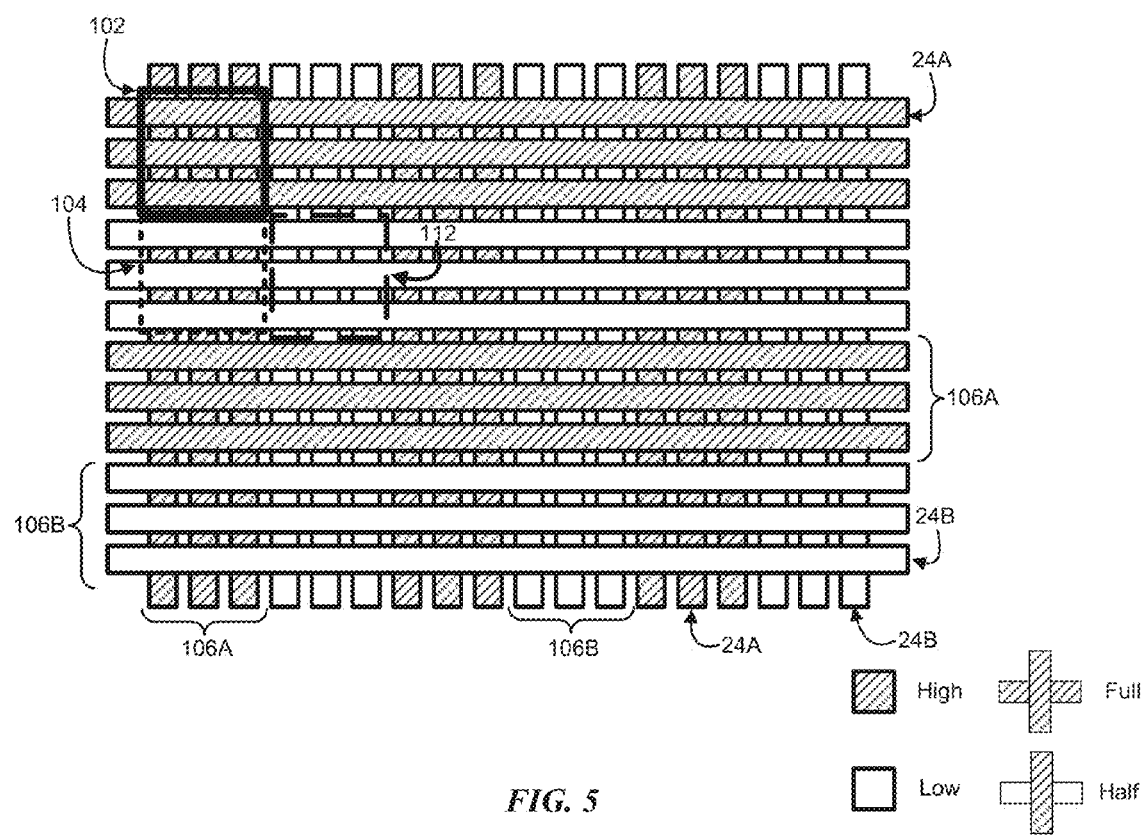
FIG. 5 illustrates an example pattern for applying voltages during a first time period in accordance with an embodiment.

FIG. 5 illustrates an example pattern for applying voltages during a first time period in accordance with an embodiment. In one embodiment, signals are applied to different areas of touch sensor 10 to systematically cycle through the touch-sensitive area to determine the position of the object providing the input to touch sensor 10. The controller of touch sensor 10 selects a set 106A of electrodes 24A to receive a signal (e.g., a synchronization signal) or a set 106B of electrodes 24B to receive a reference voltage, such as, for example, a low voltage (e.g., ground) such that patterns of biased electrodes 24A-B are formed. For example, these patterns partition touch-sensitive area 54 into areas that have a "full" signal, "medium" signal, or are held at the low voltage.

For example, first signal area 102 include an area with an overlap of set 106A of electrodes 24A that receive the applied signal. For instance, when x-electrodes 24A overlap y-electrodes 24A that both receive the applied signal, an area 102 of the overlap has a maximum amplitude or "full" signal. As another example, second signal areas 104 is defined as an area with overlap of an electrode 24A receiving the applied signal with an electrode 24B receiving the low voltage. For instance, when y-electrodes 24A overlap x-electrodes 24B or x-electrodes 24A overlap y-electrode 24B, the area 104 of the overlap has approximately half the applied signal or "medium" signal. Furthermore, low voltage area 112 is defined as an overlap between electrodes 24B that receive the low voltage. For example, when y-electrode 24B, which receives the low voltage, overlaps x-electrode 24B, which also receives the low voltage, area 112 is classified as a third voltage area 112. In one embodiment, the signal with the peak voltage is applied to set 106A of electrodes 24A at substantially the same time as the low voltage is applied to set 106B of electrodes 24B.

In one embodiment, the presence of second signal area 104 and third signal area 112 reduces the amount of or eliminates coupling of the applied signal through large area touches within touch-sensitive area 54 of touch sensor 10 as described above. For example, a large area touch within a second signal area 104 couples the applied signal to the sense unit of active stylus 30 from the "medium" signal and a large area touch within a third voltage area 112 couples the applied signal to the sense unit of active stylus 30 from the low voltage. In one embodiment, by systemically cycling through different patterns, portions of touch-sensitive area 54 systematically receive the "full" signal and low voltage during the "object not detected" mode of operation. In one embodiment, the "low voltage" may include a voltage with a fixed value. For example, if the "full" signal is a square wave with pre-determined voltage values of 0 volts and 3 volts, the "low voltage" may be 3 volts, 0 volts, or any suitable fixed voltage. In another embodiment, the "low voltage" may be replaced with a signal having a reduced amplitude relative to the "full" signal. For example, the "low voltage" is replaced with a signal that varies between 0 volts to 1 volt relative to a "full" signal that varies between 0 volts to 3 volts.

Touch-sensitive area 54 is partitioned into any combination of one or more first signal areas 102, one or more second signal areas 104, and one or more third voltage areas 112, as illustrated in the examples of FIGS. 5-8. In one embodiment, which areas are classified as first signal areas 102 and which areas are classified as second signal areas 104 is characterized by which combinations of electrodes 24A that are selected to receive the applied signal and electrodes 24B that are selected to be biased to the low voltage (e.g., ground).

In one embodiment, touch-sensor controller 12 selects set 106A of electrodes 24A, such that electrodes 24B receiving the low voltage is interposed between electrodes 24A. Touch-sensor controller 12 modifies the set 106A of electrodes 24A that are selected to receive the applied signal and set 106B of electrodes 24B selected to receive the low voltage as a function of time. In one embodiment, touch-sensor controller 12 systematically cycles through patterns that include set 106A of electrodes 24A and set 106B of electrodes 24B. For example, set 106A of electrodes 24A and set 106B of electrodes 24B during a first time period forms a pattern of first signal areas 102, second signal areas 104, and third voltage areas 112 such as, for example, in a manner as illustrated FIG. 5.

Figure 6:
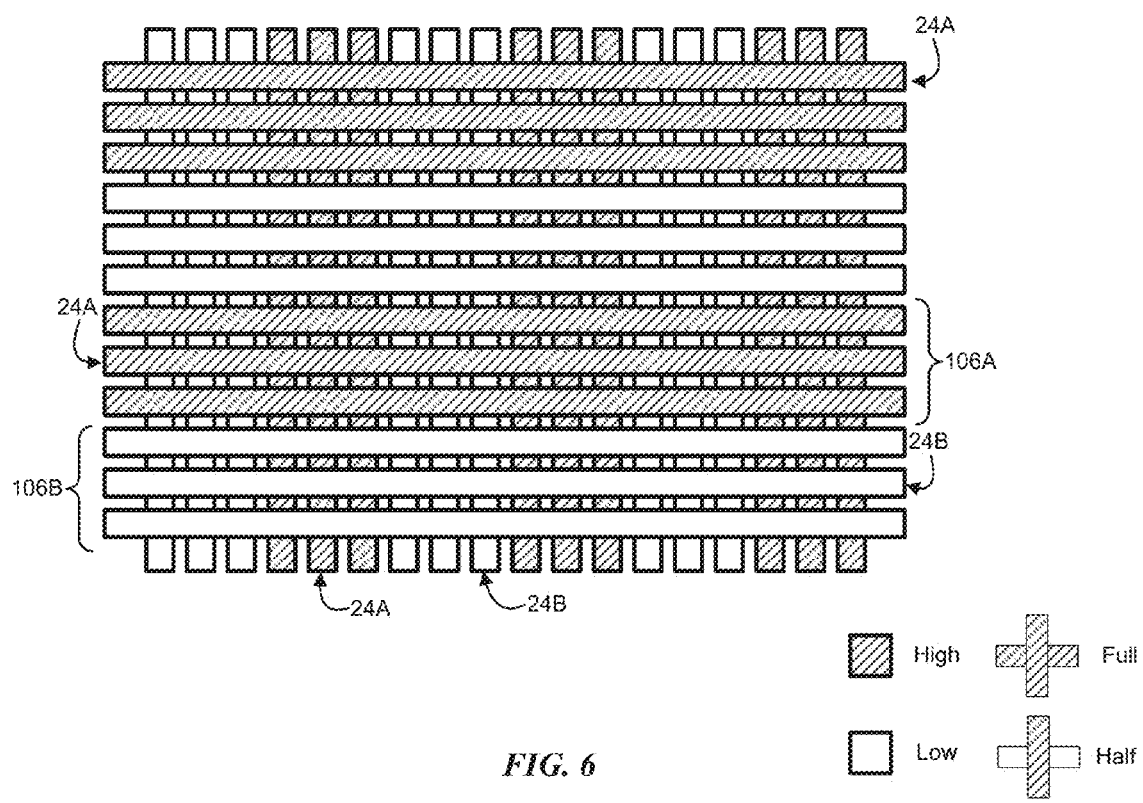
FIG. 6 illustrates an example pattern for applying voltages during a second time period in accordance with an embodiment.

FIG. 6 illustrates an example pattern for applying voltages during a second time period in accordance with an embodiment. Touch-sensor controller 12 modifies set 106A of electrodes 24A and set 106B of electrodes 24B, such that the pattern of electrodes 24A and electrodes 24B during a second time period is offset in the x-direction relative the pattern during the first time period. In one embodiment, touch-sensor controller 12 modifies set 106A of electrodes 24A and set 106B of electrodes 24B, such that the number of electrodes 24A-B included in each set 106A-B varies. For example, in a first cycle of patterns, set 106A of electrodes 24A includes bands or subsets of three electrodes 24A and in a second cycle, set 106A of electrodes 24A includes bands of four electrodes 24A. Although this disclosure illustrates and describes sets of electrodes having bands or subsets with a particular number of electrodes, it is noted that the present technology is not limited to these example sets of electrodes, and that other configurations may be implemented, such as for example bands with an equal number of electrodes 24A and electrodes 24B, or bands with a different number of electrodes 24A compared to the number of electrodes 24B.

Figure 7:
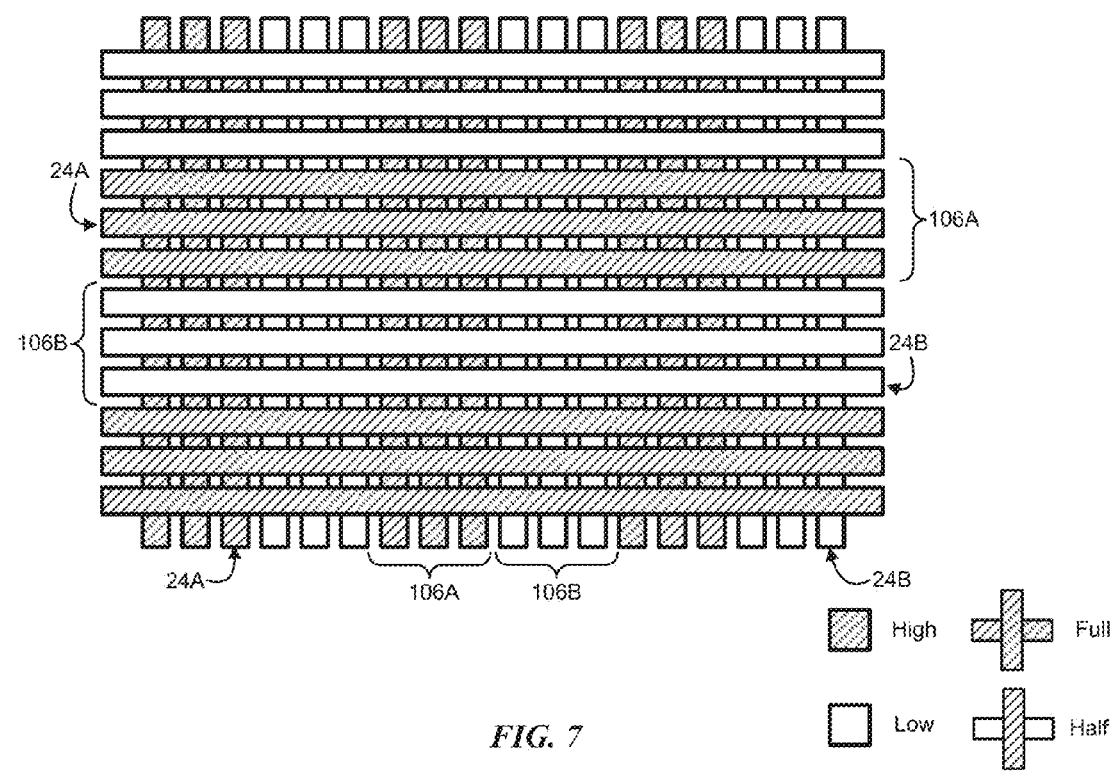
FIG. 7 illustrates an example pattern for applying voltages during a third time period in accordance with an embodiment.

FIG. 7 illustrates an example pattern for applying voltages during a third time period in accordance with an embodiment. Touch-sensor controller 12 modifies set 106A of electrodes 24A and set 106B of electrodes 24B, such that the pattern of selected electrodes 24A and unselected electrodes 24B during a third time period is offset in the y-direction relative the pattern during the first time period, such as, for example, in a manner as illustrated FIG. 7. In one embodiment, touch-sensor controller 12 modifies set 106A of selected electrodes 24A and set 106B of electrodes 24B, such that the position of subsets or bands of electrodes 24A-B varies as a function of time. For example, the offset of bands of electrodes 24A varies in position by a number of electrodes along either the horizontal or vertical orientation (e.g., extending along a x-axis or y-axis, respectively). The application of the signal on electrodes 24A returns position data corresponding to any touch input within touch-sensitive area 54. For example, the position of active stylus 30 is determined by identifying the x-electrodes and y-electrodes detecting the highest amplitude signal received in response to the signal transmitted by electrodes 24A of touch sensor 10. This position data in turn is used for subsequent "object detected" mode measurements, such as, for example, in a manner as described below.

Figure 8:
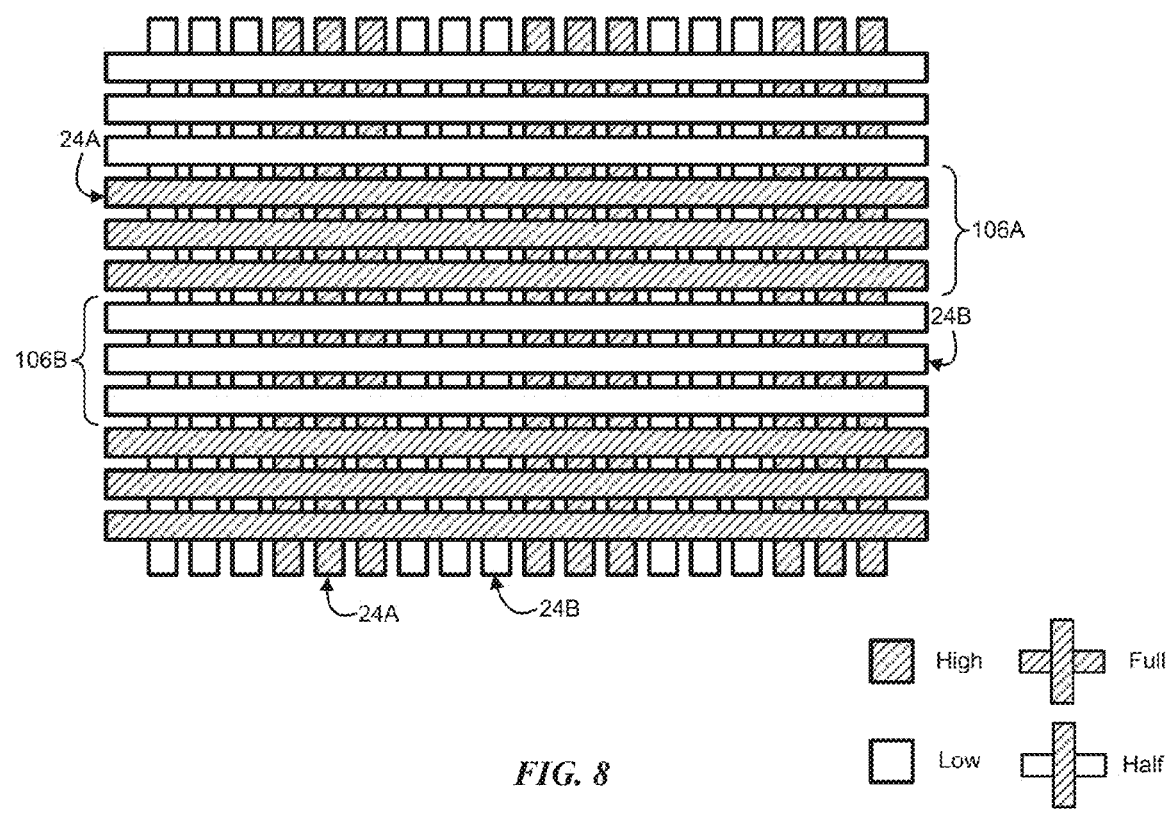
FIG. 8 illustrates an example pattern for applying voltages during a fourth time period in accordance with an embodiment.

FIG. 8 illustrates an example pattern for applying voltages during a fourth time period in accordance with an embodiment. Touch-sensor controller 12 modifies set 106A of electrodes 24A receiving the applied signal and set 106B of electrodes 24B receiving the low voltage, such that the pattern of selected electrodes 24A and unselected electrodes 24B is offset in the x-direction from the pattern of the third time period. In one embodiment, the offset in the pattern at different time periods may correspond to a pre-determined number of unselected electrodes 24B. For example, the offset is equal to the number of unselected electrodes 24B in set 106B. In one embodiment, the patterns cycle through a sequence to cover either a majority or the entirety of the touch-sensitive area 54 during a pre-determined number of cycles or time periods, e.g., four cycles. Although this disclosure illustrates and describes a technique of transmitting a signal to an active stylus using a particular number of particular electrode patterns, it is noted that the present technology is not limited to these example techniques, and that other techniques may be implemented.

FIGS. 9-13 illustrate example touch exclusion bias patterns in accordance with an embodiment. As described above, the capacitive coupling of the signal through the user is reduced by excluding a set 106B of electrodes 24B underneath an area 110 of a touch input from receiving the signal and transmitting the signal using the remaining electrodes. In the illustrated example, set 106B of electrodes 24B covering at least a portion of area 110 of the touch input (shown in FIGS. 9-13) receives the low voltage to reduce coupling between touch sensor 10 and the sense unit of active stylus 30. In one embodiment, touch-sensor controller 12 applies the low voltage to set 106B of electrodes 24B corresponding to an area 110 of a touch-input within touch-sensitive area 54. For example, position data corresponding to relatively large area touches is received from the self-capacitance measurements performed as part of the "object not detected" mode. Using the position data, touch-sensor controller 12 selects set 106B of electrodes 24B corresponding to area 110 of the touch and applies the low voltage to a set 106B of electrodes 24B. As described above, touch-sensor controller 12 applies a signal to set 106A of electrodes 24A and a low voltage on one or electrodes 24B. For example, the signal applied to electrodes 24A includes a number of pulses that have an amplitude of a pre-determined voltage, such as the supply voltage.

Figure 9:
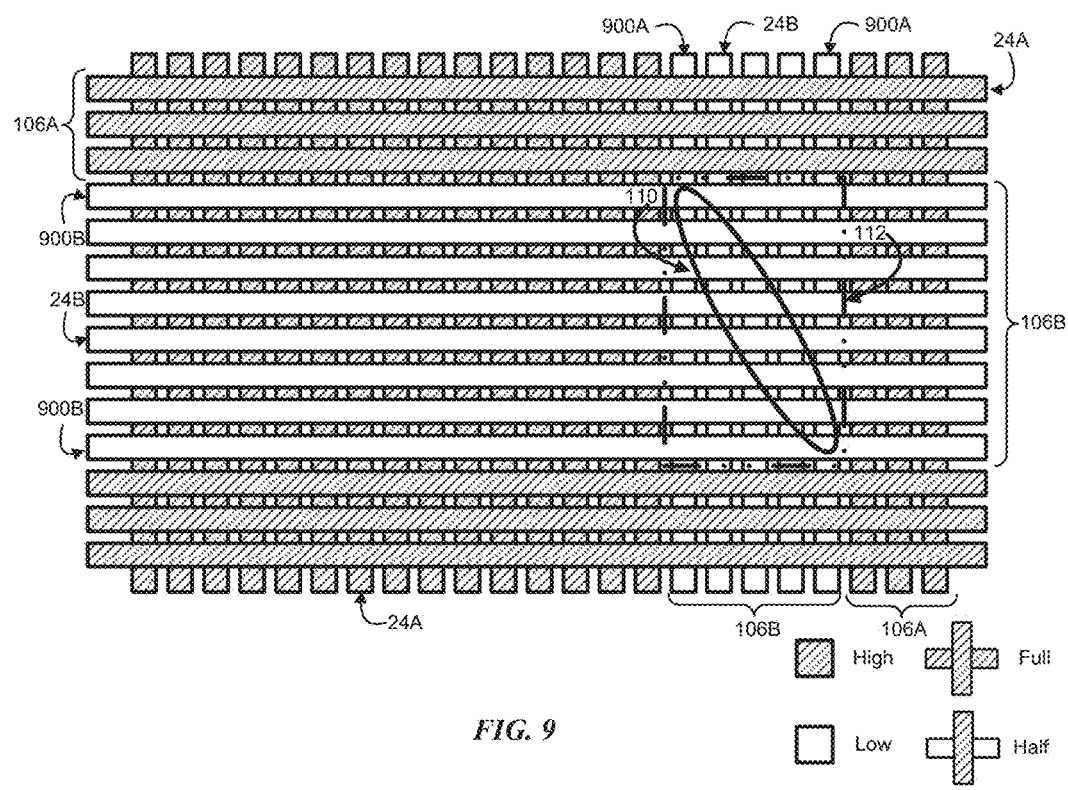
FIG. 9 illustrates an example touch exclusion bias pattern covering an area of a touch input in accordance with an embodiment.

FIG. 9 illustrates an example touch exclusion bias pattern covering touch area 110 of a touch input in accordance with an embodiment. In one embodiment, the self-capacitance measurement data corresponding to the touch input is processed to determine one or more edges of the touch area 110. detecting an edge of the area of the touch input, wherein the selected first set of the first plurality of electrodes corresponds to the detected edge of the touch input To illustrate, an example implementation provides that first and second portions of the x-electrodes and y-electrodes correspond, or overlap, in plan view of the touch sensor (as shown) with first portion 900A and second portion 900B, respectively, located along the detected edge of the touch area 110. In other words, low signal area 112 encompasses the entirety of the touch area 110 plus a buffer area to compensate for uncertainty in the area of the touch area 110. Furthermore, set 106B of electrodes 24B that are selected to receive the low voltage corresponding to an edge of the touch area 110. As described above, set 106A of electrodes 24A, corresponding to the remaining electrodes, receives the applied signal (e.g., a synchronization signal that includes a pre-determined peak voltage). Set 106B of electrodes 24B that receives the low voltage defines a low signal area 112 that encompasses the entirety of touch input 110, such as, for example, in a manner as illustrated in FIG. 9. For example, low signal area 112 is defined by set 106B of electrodes 24B oriented along both the x-direction and y-direction.

Figure 10:
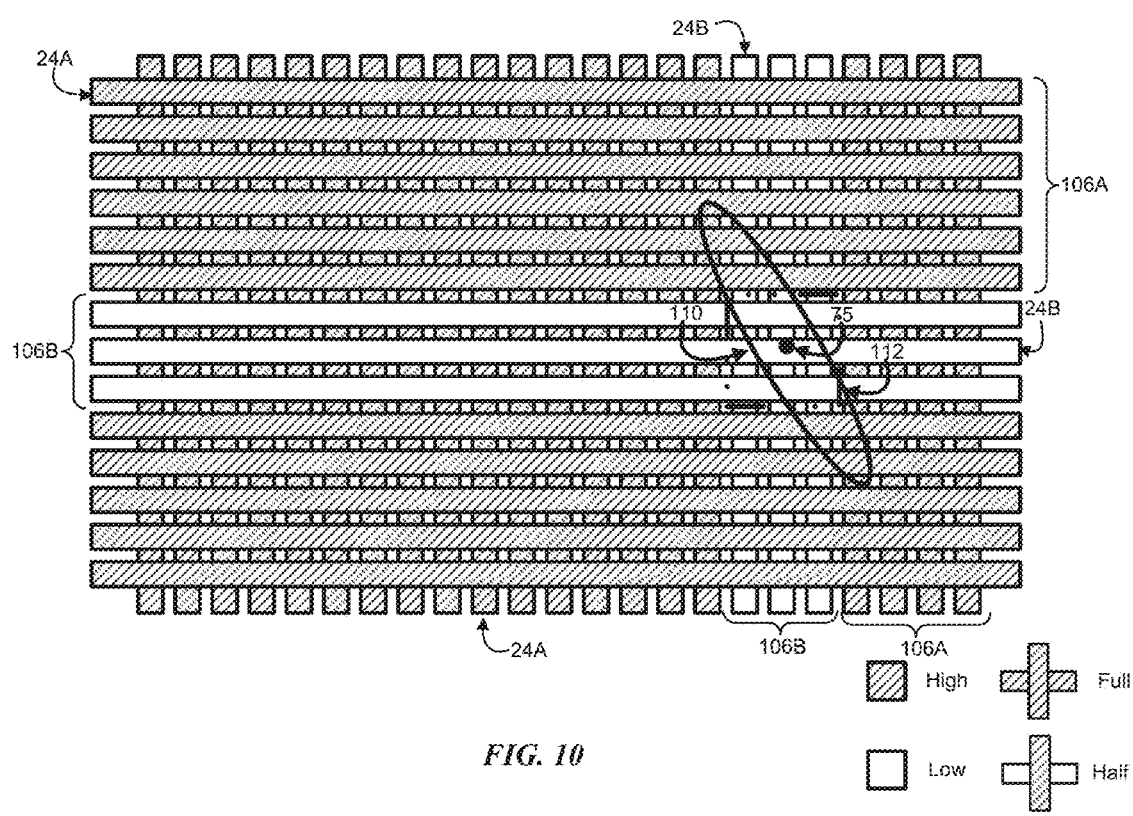
FIG. 10 illustrates an example touch exclusion bias pattern covering a portion of an area of a touch input in accordance with an embodiment.

FIG. 10 illustrates an example touch exclusion bias pattern covering a portion of touch area 110 of a touch input in accordance with an embodiment. Touch area 110 encompasses a portion of the touch input and excludes the synchronization signal from a smaller area. Touch-sensor controller 12 selects set 106B of electrodes 24B defining a low signal area 112 that corresponds to a pre-determined percentage of touch area 110, e.g., 50 percent, such as, for example, in a manner as illustrated FIG. 10. For example, low signal area 112 includes a center of touch area 110 or centroid of the touch input, such that low signal area 112 is centered about the centroid of touch area 110. In an embodiment, the term "centroid" is defined as an arithmetic mean position of all points within the touch area 110. Moreover, in one embodiment, a centroid 75 of the low signal area 112 substantially corresponds to a location of the centroid of touch area 110.

Figure 11:
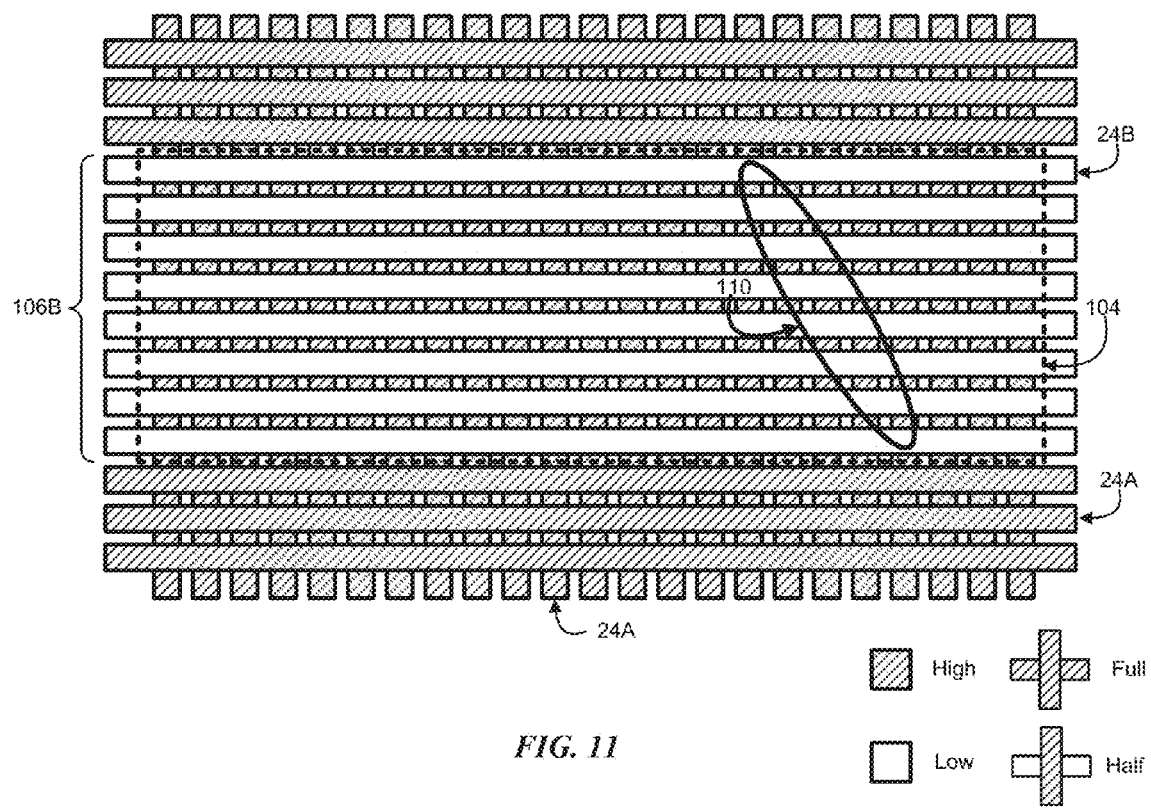
FIG. 11 illustrates an example touch exclusion bias pattern with electrodes along the horizontal orientation in accordance with an embodiment.

FIG. 11 illustrates an example touch exclusion bias pattern with electrodes along the horizontal orientation in accordance with an embodiment. In one embodiment, touch-sensor controller 12 selects set 106B of electrodes 24B along a single axis corresponding to area 110 of the touch input to receive the low voltage. For example, set 106B includes electrodes 24B that include or intersect touch area 110 of the touch input that are oriented along the horizontal direction (e.g., x-axis). In one embodiment, it may be advantageous, to exclude electrodes 24B oriented along the horizontal direction when touch area 110 has a horizontal orientation. Moreover, one embodiment provides that set 106B excludes electrodes oriented along the horizontal direction that do not include or intersect touch area 110.

Figure 12:
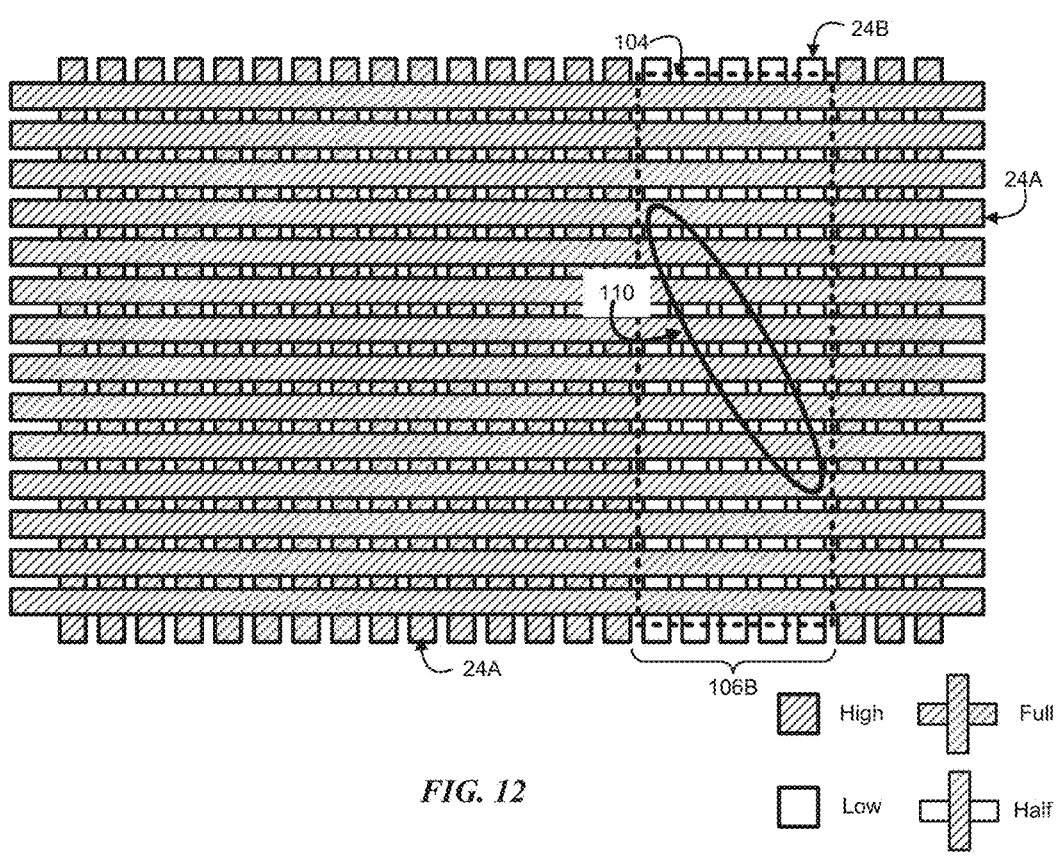
FIG. 12 illustrates an example touch exclusion bias pattern with electrodes along the vertical orientation in accordance with an embodiment.

FIG. 12 illustrates an example touch exclusion bias pattern with electrodes along the vertical orientation in accordance with an embodiment. In one embodiment, touch-sensor controller 12 selects set 106B of electrodes 24B along a single axis corresponding to area 110 of the touch input to receive the low voltage. For example, set 106B includes electrodes 24B that include or intersect touch area 110 that are oriented along the vertical direction (e.g., y-axis). In one embodiment, electrodes 24A outside of set 106B of electrodes 24B receives the applied signal. Furthermore, one embodiment provides that set 106B excludes electrodes oriented along the vertical direction that do not include or intersect touch area 110. In one embodiment, it may be advantageous, to exclude set 106B of electrodes 24B oriented along the vertical direction when touch area 110 has a vertical orientation.

Figure 13:
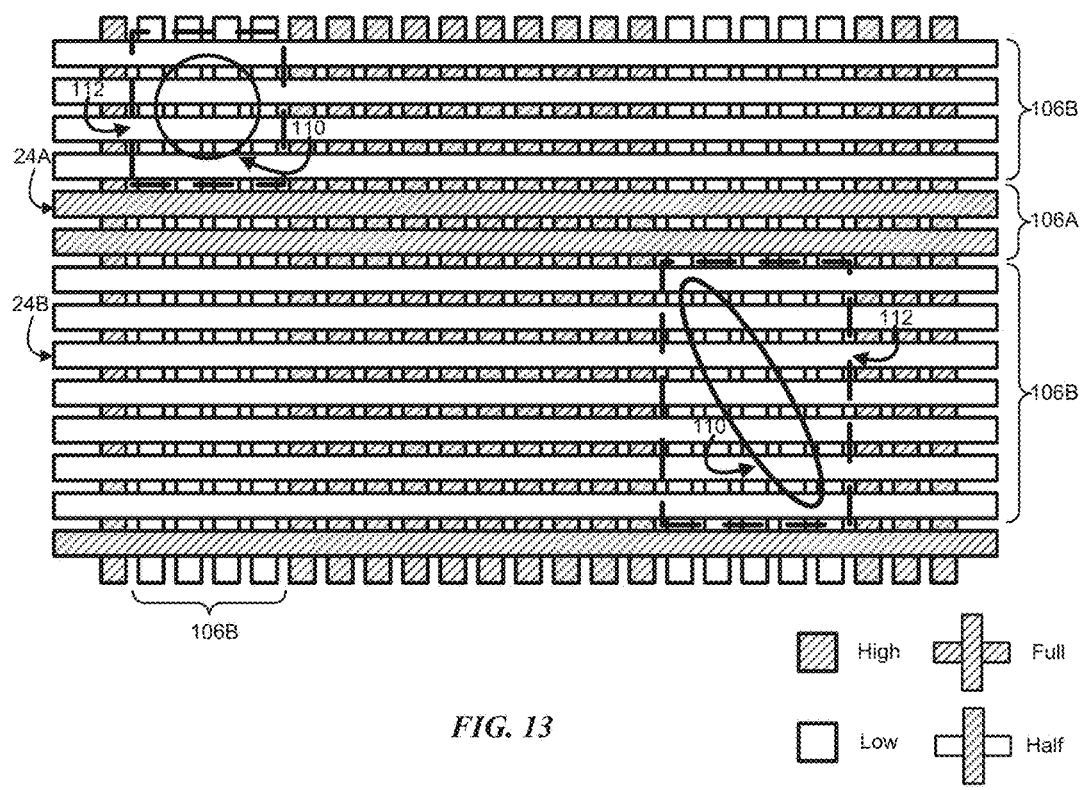
FIG. 13 illustrates an example touch exclusion bias pattern for multiple touch inputs in accordance with an embodiment.

FIG. 13 illustrates an example touch exclusion bias pattern for multiple touch inputs in accordance with an embodiment. In one embodiment, set 106B of electrodes 106B is selected to exclude the touch area 110. Furthermore, selection of a set 106B of electrodes 24B is in response to determining touch area 110 is larger than a pre-determined threshold area, e.g., 20 square millimeters, corresponding to a touch input from a palm of a user. In one embodiment, the pre-determined threshold area, e.g., 10 square millimeters (mm²), corresponds to a touch input from a finger of the user. Furthermore, the pre-determined threshold area is a physical parameter defined by one or more parameters, e.g., square millimeters, percentage of touch-sensitive area 54, number of electrodes, number of electrode positions, or any combination thereof.

As described above, touch-sensor controller 12 selects set 106B of electrodes 24B corresponding to touch area 110, to receive the low voltage. In one embodiment, a touch input located within a second signal area 104 weakly couples the applied signal to the sense unit of active stylus 30 and a touch input within a low voltage area 112 minimally couples the applied signal to the sense unit of active stylus 30. In one embodiment, in situations when a large touch input is present, applying ground to electrodes 24B below area 110 of the touch input reduces or eliminates coupling from touch sensor 10 and the sense unit of active stylus 30 through the user.

Figure 14A:
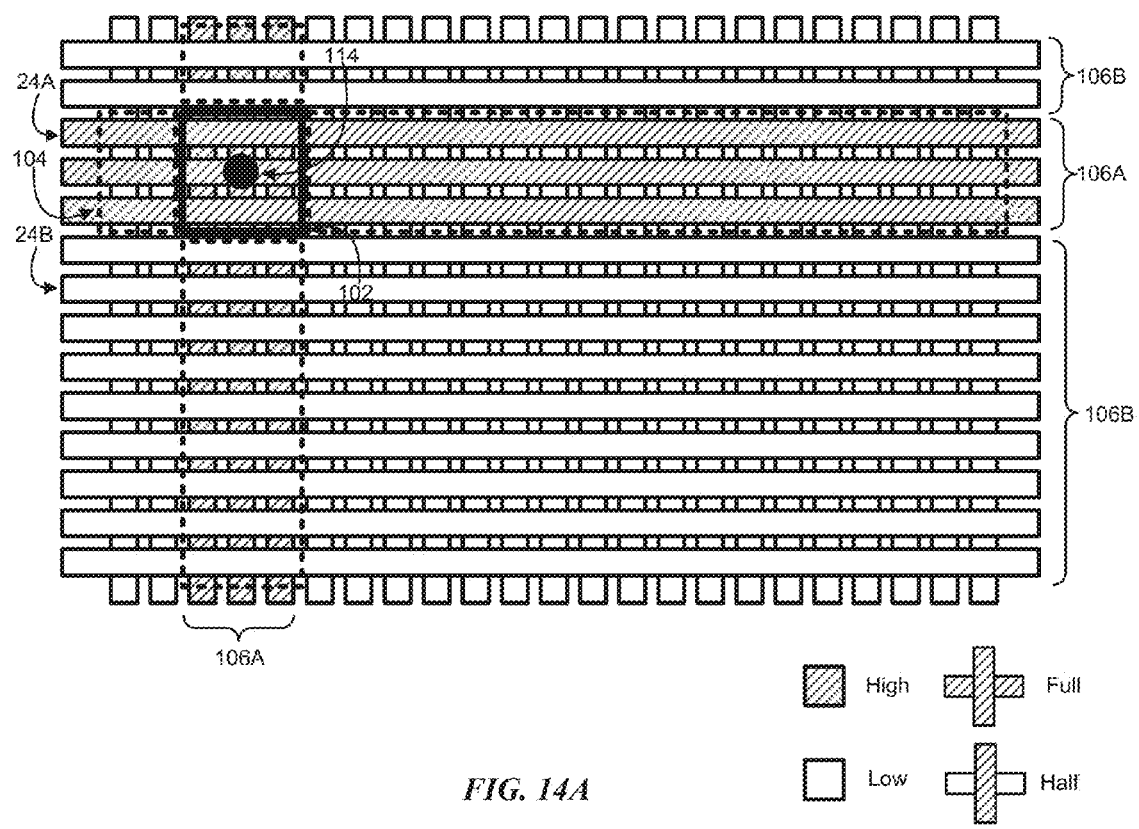
FIG. 14A illustrates an example synchronization bias patterns having an overlap area around an object in accordance with an embodiment.

FIG. 14A illustrates an example synchronization bias pattern having an overlap area around a stylus input in accordance with an embodiment. In the illustrated example, an overlap of set 106A of electrodes 24A receiving an applied signal corresponds to an area of touch sensor 10 in which a determined position of active stylus 30 is located, while remaining set 106B of electrodes 24B receive a low voltage. As described above, in one embodiment, with respect to stylus interaction, touch-sensor controller 12 operates in at least the following two modes: "object not detected" and "object detected" modes. Based on receiving a signal from active stylus 30 in response to a signal (e.g., a synchronization signal) applied to set 106A of electrodes 24A of touch sensor 10, touch-sensor controller 12 enters the "object detected" mode. For example, in the "object not detected" mode, touch-sensor controller 12, during a time interval, transmits a signal (e.g., a synchronization signal) to detect an active stylus (e.g., active stylus 30) in proximity to touch sensor 10. In certain embodiments, touch-sensor controller 12 transmits the signal (e.g., the synchronization signal) using a sequence of electrode patterns, such as the electrode pattern described above with reference to FIGS. 5-8. In certain embodiments, a signal including a waveform with one or more peak voltages is applied to set 106A of electrodes 24A, while a reference voltage is applied to set 106B of electrodes 24B. For example, the signal applied to set 106A of electrodes 24A is waveform that has a peak voltage approximately equal to a supply voltage of touch sensor 10 and voltage applied to set 106B of electrodes 24B is ground. Additionally or alternatively, in the "object not detected" mode, touch-sensor controller 12 transmits a signal to active stylus 30 using a set 106A of electrodes 24A that exclude an area of a touch input determined using the self-capacitance measurements, such as according to the example described above with reference to FIGS. 9-13.

Active stylus 30, when in proximity to touch sensor 10, transmits a signal in response to the synchronization signal transmitted by touch sensor 10. The response signal communicated by active stylus 30 is received by set 106A of electrodes 24A of touch sensor 10. Touch-sensor controller 12 processes the received signal to determine a position 114 of active stylus 30. For example, touch-sensor controller 12 determines that active stylus 30 is located in proximity to touch sensor 10 at position 114 based on identifying one or more x-electrodes and y-electrodes receiving the largest amplitude signal from active stylus 30. Although a particular technique for determining position is described, the present disclosure contemplates touch-sensor controller 12 determining the position of active stylus 30 according to any suitable technique.

In one embodiment, touch-sensor controller 12 uses the determined position (e.g., position 114) of active stylus 30 to determine the electrodes 24A to be driven in one or more subsequent detection cycles to track the position of active stylus 30. For example, touch sensor controller 12 may use the determined position (e.g., position 114) of active stylus 30 to select set 106A of electrodes 24A that define a shape or area 102 around the determined position 114 of active stylus 30, such as, for example, in a manner as illustrated FIGS. 14A-B. In one embodiment, the signal is applied based at least in part on the area of the touch input being larger than a pre-determined area. For example, area 102 is defined as an overlap of set 106A of electrodes 24A that receive the applied signal from touch-sensor controller 12. In certain embodiments, the shape of the overlap area 102 of set 106A of electrodes 24A is a box formed around the determined position 114 of active stylus 30. Although this disclosure describes or illustrates driving or biasing electrodes such that the overlap of biased electrodes set 1096A of 24A has a particular shape, it is noted that the present technology is not limited to these example shapes, and that other shapes may be implemented, such as for example a square or rectangular shaped area.

In one embodiment, the overlap of electrodes 24A defines area 102 that receives a signal in the next stylus acquisition. As described above, the signal includes one or more pulses having a pre-determined peak voltage. Electrodes 24B located outside area 102 is selected to receive a pre-determined lower voltage, such as ground or another suitable reference voltage. For example, the determined position 114 of active stylus 30 is determined from measurement data obtained using any technique, such as for example, by excluding electrodes 24B in an area 110 corresponding to a touch input from transmitting the synchronization signal or transmitting the synchronization signal through a cyclical pattern of electrodes 24A. Although this disclosure describes or illustrates particular techniques of determining the position of active stylus 30, it is noted that the present technology is not limited to these example techniques, and that other techniques may be implemented, such as for example, through application of the signal to all electrodes of touch sensor 10 and detecting a subsequent response signal from active stylus 30.

A majority of touch-sensitive area 54 may receive the low voltage, such that the applied signal is not coupled to the sense unit of active stylus 30 through capacitive coupling with the user contacting device 50. In one embodiment, the signal that includes the pre-determined peak voltage is applied to electrodes 24A substantially simultaneously while applying the low voltage to electrodes 24B. In one embodiment, a touch input located within a medium signal area 104 weakly couples the applied signal to the sense unit of active stylus 30 and a touch input within a low voltage area minimally couples the applied signal to the sense unit of active stylus 30. As active stylus 30 is being used, the determined position 114 of active stylus 30 may move out of area 102. In one embodiment, selection of set 106A of electrodes 24A receiving the applied signal is recalculated after every measurement cycle with an updated determined active stylus position 114. For example, the velocity, e.g., speed and direction of motion, of active stylus 30 is determined based on a change in the determined active stylus position 114 obtained from separate measurements and the selection of electrodes 24A to receive the signal is adjusted according to the determined velocity of active stylus 30.

Figure 14B:
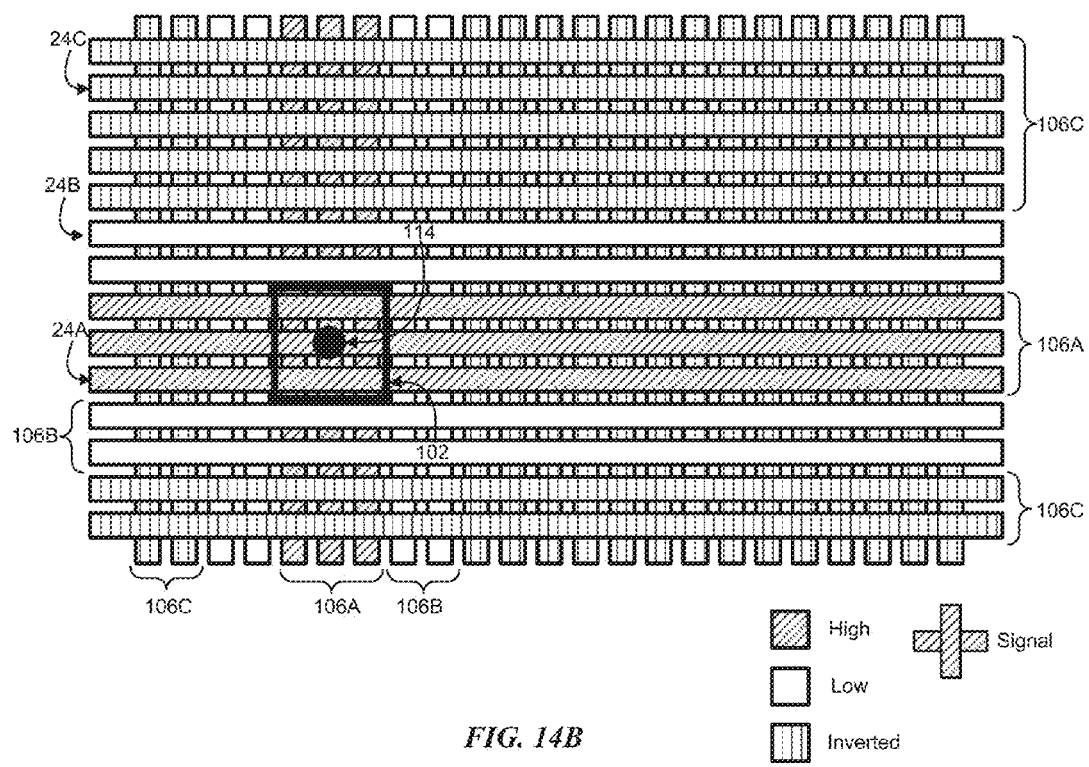
FIG. 14B illustrates an example synchronization bias patterns having an overlap area and guard band around an object in accordance with an embodiment.

FIG. 14B illustrates an example synchronization bias pattern having an overlap and guard band around a stylus input in accordance with an embodiment. In the illustrated example, an overlap of electrodes 24A receiving an applied signal corresponds to an area of touch sensor 10 in which a determined position of active stylus 30 is located, while a first subset of electrodes 24B receive a low voltage and a second subset of electrodes 24C receive an inverted signal relative to the signal applied to electrodes 24A. In one embodiment, the low voltage is ground and the inverted signal applied to electrodes 24C is an inverted version of the signal applied to electrodes 24A (e.g., 180° out of phase with or having a polarity reversed relative to the applied signal).

As described above, in one embodiment, with respect to stylus interaction, touch-sensor controller 12 may operate in at least the following two modes: "stylus not detected" and "stylus detected" modes. Based on receiving a signal from active stylus 30 in response to a signal (e.g., a synchronization signal) applied to the set of electrodes 24A of touch sensor 10, touch-sensor controller 12 enters the "object detected" mode. For example, in the "stylus not detected" mode, touch-sensor controller 12, at any suitable interval, transmits a signal (e.g., a synchronization signal) to detect an active stylus (e.g., active stylus 30) in proximity to touch sensor 10. In one embodiment, touch-sensor controller 12 transmits the signal (e.g., the synchronization signal) using a sequence of electrode patterns, such as the electrode pattern described above with reference to FIGS. 5-8. Additionally or alternatively, in the "object not detected" mode, touch-sensor controller 12 transmits a signal to active stylus 30 using a set 106A of electrodes 24A that exclude an area of a touch input determined using the self-capacitance measurements, such as according to the example described above with reference to FIGS. 9-13.

Active stylus 30, when in proximity to touch sensor 10, transmits a signal in response to the signal (e.g., the synchronization signal) transmitted by touch sensor 10. The response signal communicated by active stylus 30 is received by set 106A of electrodes 24A of touch sensor 10. Touch-sensor controller 12 may process the received signal to determine a position 114 of active stylus 30. For example, touch-sensor controller 12 determines that active stylus 30 is located in proximity to touch sensor 10 at position 114 based on identifying one or more x-electrodes and y-electrodes receiving the largest amplitude signal from active stylus 30. Although a particular technique for determining position is described, it is noted that the present technology is not limited to these example techniques, and that other techniques may be implemented.

In one embodiment, touch-sensor controller 12 uses the determined position (e.g., position 114) of an object (e.g., active stylus 30) to determine the electrodes 24A to be driven in one or more subsequent detection cycles to track the position of active stylus 30. For example, touch sensor controller 12 uses the determined position (e.g., position 114) of active stylus 30 to select set 106A of electrodes 24A that define a shape or area 102 around the determined position 114 of active stylus 30, such as, for example, in a manner as illustrated FIG. 14A. For example, area 102 is defined as an overlap of electrodes 24A that receive the applied signal from touch-sensor controller 12. In one embodiment, the shape of the overlap area 102 of electrodes 24A is a box formed around the determined position 114 of active stylus 30. Although this disclosure describes or illustrates driving or biasing electrodes such that the overlap of biased electrodes 24A has a particular shape, it is noted that the present technology is not limited to these example shapes, and that other shapes may be implemented, such as for example a square or rectangular shaped area.

In one embodiment, the overlap of electrodes 24A defines area 102 that receives a signal in the next object acquisition. As described above, the signal includes one or more pulses having a pre-determined peak voltage. Set 106C of electrodes 24C located outside area 102 is selected to receive the inverted signal and electrodes 24B adjacent to area 102 is selected to receive a pre-determined lower voltage, such as ground or another suitable reference voltage. For example, the determined position 114 of active stylus 30 is determined from measurement data obtained using any suitable technique, such as for example, by excluding electrodes 24B in an area 110 corresponding to a touch input from transmitting the synchronization signal or transmitting the synchronization signal through a cyclical pattern of electrodes 24A. Although this disclosure describes or illustrates particular techniques of determining the position of active stylus 30, it is noted that the present technology is not limited to these example techniques, and that other techniques may be implemented, such as for example, through application of the signal to all electrodes of touch sensor 10 and detecting a subsequent response signal from active stylus 30.

A majority of the touch-sensitive area may receive the inverted signal, such that the inverted signal is coupled to the sense unit of active stylus 30 through capacitive coupling with the user contacting device 50. The coupling of the inverted signal to the sense unit of active stylus 30 through the user increases the magnitude of the applied signal detected by the edge detectors of the sense unit. Furthermore, applying the low voltage to electrodes 24B adjacent to area 102 causes electrodes 24B to act as a guard band, thereby preventing the inverted signal from corrupting the applied signal of electrodes 24A detected by the sense unit of active stylus 30. In one embodiment, the signal that includes the pre-determined peak voltage is applied to electrodes 24A substantially simultaneously while applying the low voltage to electrodes 24B and the inverted signal to set 106C of electrodes 24C. For example, the inverted signal is applied to electrodes 24C in areas that includes a touch input or substantially the touch sensitive area of the touch sensor excluding area 102 and the guard band adjacent to area 102. As active stylus 30 is being used, the determined position 114 of active stylus 30 moves out of area 102. In one embodiment, selection of the set of electrodes 24A receiving the applied signal and the subset of electrodes 24B receiving the low voltage is recalculated after every measurement cycle with an updated determined active stylus position 114. For example, the velocity, e.g., speed and direction of motion, of active stylus 30 is determined based on a change in the determined active stylus position 114 obtained from separate measurements and the selection of electrodes 24A and 24B to receive the applied signal and low voltage, respectively, is adjusted according to the determined velocity of active stylus 30.

Figure 15:
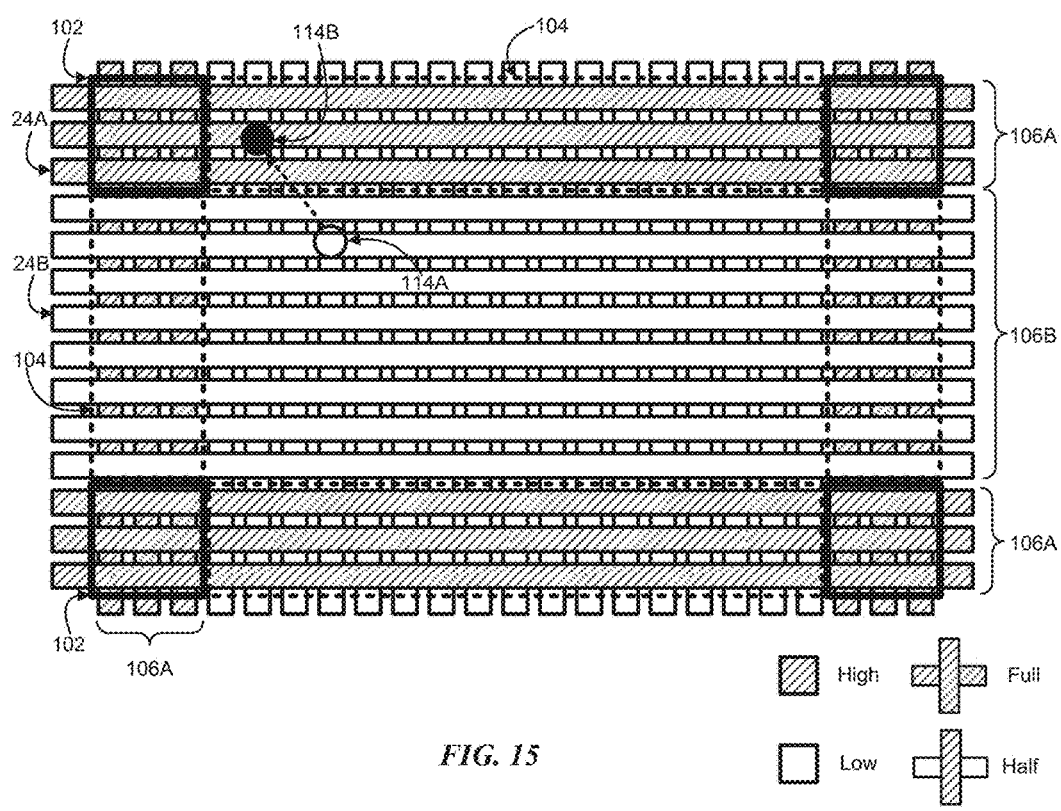
FIG. 15 illustrates an example synchronization bias pattern having one or more overlap areas along one or more edges of the touch sensor in accordance with an embodiment.

FIG. 15 illustrates an example synchronization bias pattern having one or more overlap areas along one or more edges of the touch sensor in accordance with an embodiment. In the illustrated example, touch-sensor controller 12 selects a set 106A of electrodes 24A along one or more edges of touch sensor 10, while remaining set 106B of electrodes 24B receive a low voltage. In one embodiment, when the determined position 114 of active stylus 30 is in proximity to an edge or corner of touch-sensitive area 54, the area encompassing determined position 114 of active stylus 30 may provide inadequate coverage to account for the approximation of determined position 114 of active stylus 30 and possible movement of active stylus 30 during use. Herein, reference to an edge encompasses an outermost electrode of the touch-sensitive area and a pre-determined number of electrodes adjacent to the outermost electrode. Furthermore, reference to an interior area encompasses the center of the touch-sensitive area up to a pre-determined number of electrodes away from the center of the touch-sensitive area. In one embodiment, set 106A of one or more electrodes 24A that correspond to an edge of touch-sensitive area 54 is selected to receive the applied signal, while set 106B of electrodes 24B within the interior area of touch-sensitive area 54 may receive the low voltage. Furthermore, areas 102 defined by an overlap of set 106A of electrodes 24A and corresponding to the corners of touch-sensitive area 54 transmits the "full" signal, while areas 104 defined by an overlap of set 106A of electrodes 24A and set 106B of electrodes 24B along the edges transmits a "medium" signal.

Touch inputs within the interior area of touch-sensitive area 54, e.g., outside of areas 102 or area 104, are coupled to ground of device 50 through set 106B of electrodes 24B. In one embodiment, touch-sensor controller 12 selects sets 106A of electrodes 24A corresponding to any edge of the periphery of touch-sensitive area 54 to receive the applied signal. For example, touch-sensor controller 12 selects sets 106A of three electrodes 24A that correspond to the entire periphery of touch-sensitive area 54. As another example, touch-sensor controller 12 selects one or more sets 106A of three electrodes 24A including the outermost electrode along two edges closest to the determined position 114 of active stylus 30. Although this disclosure describes or illustrates particular techniques for determining the position 114 of active stylus 30, it is noted that the present technology is not limited to these example techniques, and that other techniques may be implemented, such as for example applying the signal to all electrodes of the touch-sensor and detecting a subsequent response signal from active stylus 30.

In one embodiment, touch-sensor controller 12 selects a new set 106A of electrodes 24A to receive the applied signal from defining an area 102 around the determined position 114 of active stylus 30 to set 106A of electrodes 24A that includes one or more edges of touch sensor 10, such as, for example, in a manner as illustrated FIG. 15. For example, when the determined position 114A of active stylus 30 is within the interior area of touch-sensitive area 54, set 106A of electrodes 24A corresponding to area 102 encompassing determined position 114A is selected, such as, for example, in a manner as illustrated FIG. 14A. Furthermore, when the determined position 114B moves within a pre-determined distance from an outermost electrode along the edge of touch-sensitive area 54, set 106A of electrodes 24A corresponding to one or more edges of touch sensor 10 are selected to receive the applied signal, such as, for example, in a manner as illustrated FIG. 15. In one embodiment, set 106A of electrodes 24A includes a pre-determined (e.g., 4 electrodes) number of contiguous electrodes 24A that includes the outermost electrode along each edge of touch sensor 10. The pre-determined distance is a fixed distance from the outermost electrode along the edge of touch sensor 10 (e.g., five millimeters), a pre-determined percentage of touch-sensitive area 54 (e.g., four percent), a pre-determined number of contiguous electrodes, pre-determined electrode positions, or any combination thereof.

One or more of the "object not detected" mode measurements is used in conjunction with one or more of the "object detected" mode measurements described above. For example, touch-sensor controller 12 transmits a synchronization signal to an active stylus. As described above, the sense unit of active stylus 30 receives the synchronization signal and the drive unit of active stylus 30 sends a signal to a device in response to the received synchronization signal. Touch-sensor controller 12 enters the "object detected" mode based on receiving the signal transmitted by active stylus 30. In one embodiment, touch-sensor controller 12 discontinues performing self-capacitance or mutual capacitance measurements and selects set 106A of electrodes 24A that define an area encompassing a determined position 114 of active stylus 30, such as, for example, in a manner as illustrated FIG. 14A. In addition, the touch-sensor controller 12 determines a velocity of movement of active stylus 30 and dynamically adjusts set 106A of selected electrodes 24A to encompass the movement of active stylus 30.

In one embodiment, touch-sensor controller 12 determines an area 110 of an input of active stylus 30 through measurement data, e.g., from a self-capacitance measurement, and exclude set 106B of electrodes 24B that define an area 112 that encompasses area 110 of the input of active stylus 30 from transmitting a subsequent synchronization signal, such as, for example, in a manner as illustrated FIGS. 9-13. As described above, the drive unit of active stylus 30 sends a signal to a device in response to the received synchronization signal and the controller of touch sensor 10 switches to the "object detected" mode in response to receiving the signal transmitted by active stylus 30. In one embodiment, touch-sensor controller 12 discontinues performing self-capacitance or mutual capacitance measurements and select sets 106A of electrodes 24A along one or more edges of the periphery of touch-sensitive area 54 in response to determining the determined position 114 of active stylus 30 is within a pre-determined distance from the periphery, such as, for example, in a manner as illustrated FIG. 15. As described above, touch-sensor controller 12 determines a velocity of movement of active stylus 30 and dynamically adjusts set 106A of selected electrodes 24A to encompass the movement of active stylus 30. For example, touch-sensor controller 12 dynamically adjusts set 106A of electrodes 24A from one or more sets 106A of electrodes 24A along the edges of the periphery to set 106A of electrodes 24A located in the interior area of touch-sensitive area 54 in response to determining the position 114 of active stylus 30 moving from within a pre-determined distance from the edge to without the pre-determined distance from an edge.

In certain embodiments, referencing a majority of electrodes 24B of touch sensor 10 to a reference voltage (e.g., ground) reduces or eliminates coupling between touch inputs on touch sensor 10 and the sense unit of active stylus 30. In certain embodiments, synchronization of active stylus 30 to device 50 is facilitated while active stylus 30 is near the edges or corners of touch sensor 10 by selecting electrodes 24A along one or more edges or the entire periphery of touch sensor 10.

Figure 16A:
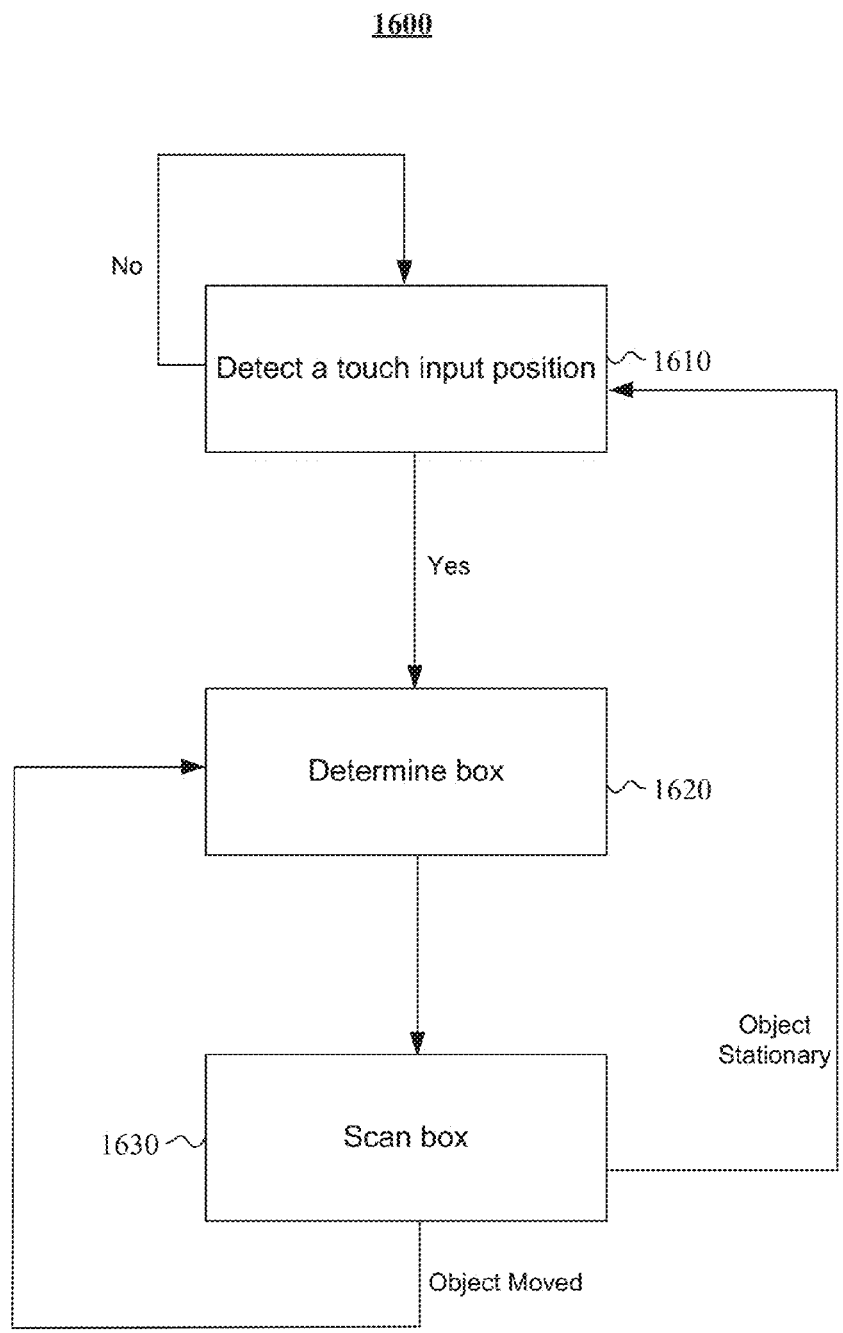
FIG. 16A illustrates an example method for detecting an object in accordance with an embodiment.

FIG. 16A illustrates an example method for detecting an object in accordance with an embodiment. The method 1600 starts at step 1610, where a position of an object is determined. In one embodiment, the touch-sensor controller performs a modified self-capacitance measurement to determine the position of an object. In another embodiment, a position of a stylus is determined by transmitting a synchronization signal to the stylus and "listening" for a signal transmitted by the stylus in response to the synchronization signal. In the absence of an object, the touch-sensor controller continues to operate in the "object not detected" mode. At step 1620 an area around the determined position of the object is determined. For example, the touch-sensor controller determines whether the object is located at the edge or within the interior of the touch-sensitive area. In one embodiment, the touch-sensor controller selects electrodes in a box around the area of the object. At step 1630, the area around the object is scanned to determine whether the object has moved to a new position relative to the touch sensor. In one embodiment, a velocity (e.g., speed and direction of motion) of the object is determined based on a change in the determined object position obtained from separate measurements. In one embodiment, if the object has moved to a new position relative to the touch sensor, the touch-sensor controller determines whether the object is near the edge or interior as illustrated in step 1620. Otherwise, the touch-sensor controller goes into the "object not detected" mode and determines the position of the object as illustrated in step 1610. Although this disclosure describes and illustrates particular steps of the method of FIG. 16A as occurring in a particular order, it is noted that the present technology is not limited to these example steps. One embodiment may repeat one or more steps of the method of FIG. 16A. Moreover, although this disclosure describes and illustrates an example method for detecting an object including the particular steps of the method of FIG. 16A, it is noted that the present technology is not limited to these example steps, and that other methods may be implemented, which may include all, some, or none of the steps of the method of FIG. 16A. Moreover, although this disclosure describes and illustrates particular components carrying out particular steps of the method of FIG. 16A, it is noted that the present technology is not limited to these example components, and that other configurations of components may be implemented.

Figure 16B:
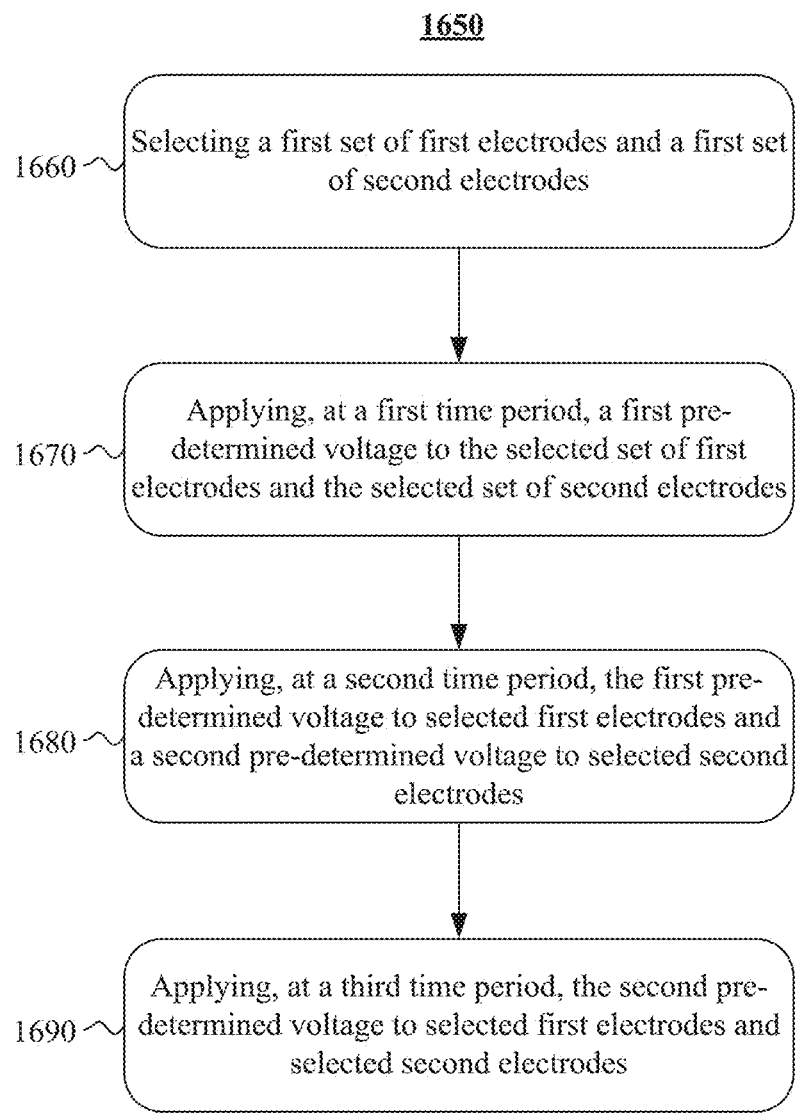
FIG. 16B illustrates an example method for detecting an object through search patterns in accordance with an embodiment.

FIG. 16B illustrates an example method for detecting an object through search patterns in accordance with an embodiment. The method 1650 starts at step 1660, where a set of first electrodes (e.g., electrodes along the horizontal orientation) and a set of the second electrodes (e.g., electrodes along the vertical orientation) are selected. In one embodiment, the selected electrodes include an overlap area formed by the selected first and second electrodes. At step 1670 a signal that includes a first pre-determined voltage is applied to the selected electrodes at a first time period. For example, the signal that includes a first pre-determined voltage is a series of pulses each with a peak voltage of a supply voltage. In one embodiment, a state of the overlap area in the first time period corresponds to a high signal. At step 1680, the first pre-determined voltage is simultaneously applied to the selected first electrodes and a second pre-determined voltage is simultaneously applied to the selected second electrodes at a second time period. For example, the second pre-determined voltage is a ground of a device. In one embodiment, the state of the overlap area corresponds to a medium signal during the second time period. Step 1690 simultaneously applies the second pre-determined voltage to the selected electrodes at a third time period, at which point the method ends. In one embodiment, the state of the overlap area corresponds to a low signal during the third time period. Although this disclosure describes and illustrates particular steps of the method of FIG. 16B as occurring in a particular order, it is noted that the present technology is not limited to these example steps. One embodiment may repeat one or more steps of the method of FIG. 16B. Moreover, although this disclosure describes and illustrates an example method for detecting a stylus including the particular steps of the method of FIG. 16B, it is noted that the present technology is not limited to these example steps, and that other methods may be implemented, which may include all, some, or none of the steps of the method of FIG. 16B. Moreover, although this disclosure describes and illustrates particular components carrying out particular steps of the method of FIG. 16B, it is noted that the present technology is not limited to these example components, and that other configurations of components may be implemented.

Figure 17:
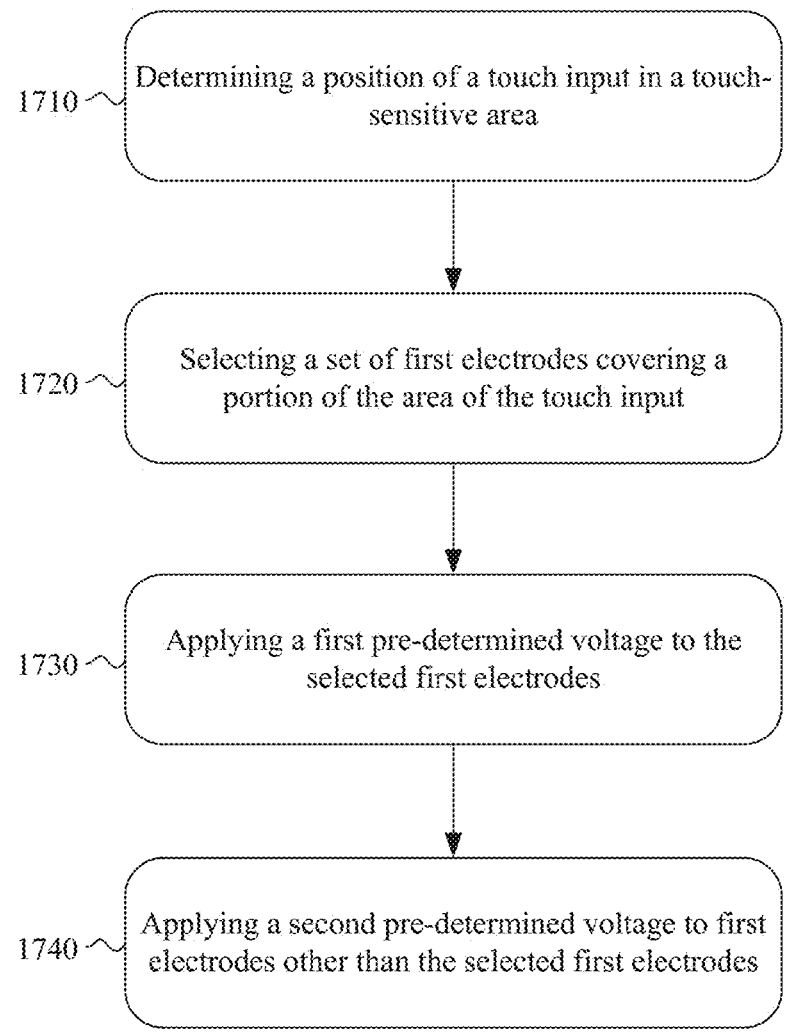
FIG. 17 illustrates an example method for detecting an object through touch area exclusion in accordance with an embodiment.

FIG. 17 illustrates an example method for detecting an object through touch area exclusion in accordance with an embodiment. The method 1700 starts at step 1710, by determining a position of a touch input in a touch-sensitive area of a touch sensor. In one embodiment, the touch input has an area larger than a pre-determined area. Step 1720 selects a set of first electrodes covering at least a portion of the area of the touch input. For example, the selected electrodes may have a vertical orientation. At step 1730, the first pre-determined voltage is simultaneously applied to the selected first electrodes. For example, the first pre-determined voltage is a series of pulse with a peak voltage of a supply voltage. Step 1740 simultaneously applies a second pre-determined voltage to electrodes other than the selected electrodes, at which point the method ends. For example, the second pre-determined voltage is ground of a device. In one embodiment, the second pre-determined voltage is applied while the first pre-determined voltage is being applied. Although this disclosure describes and illustrates particular steps of the method of FIG. 17 as occurring in a particular order, it is noted that the present technology is not limited to these example steps. One embodiment may repeat one or more steps of the method of FIG. 17. Moreover, although this disclosure describes and illustrates an example method for detecting a stylus including the particular steps of the method of FIG. 17, it is noted that the present technology is not limited to these example steps, and that other methods may be implemented, which may include all, some, or none of the steps of the method of FIG. 17. Moreover, although this disclosure describes and illustrates particular components carrying out particular steps of the method of FIG. 17, it is noted that the present technology is not limited to these example components, and that other configurations of components may be implemented.

Figure 18:
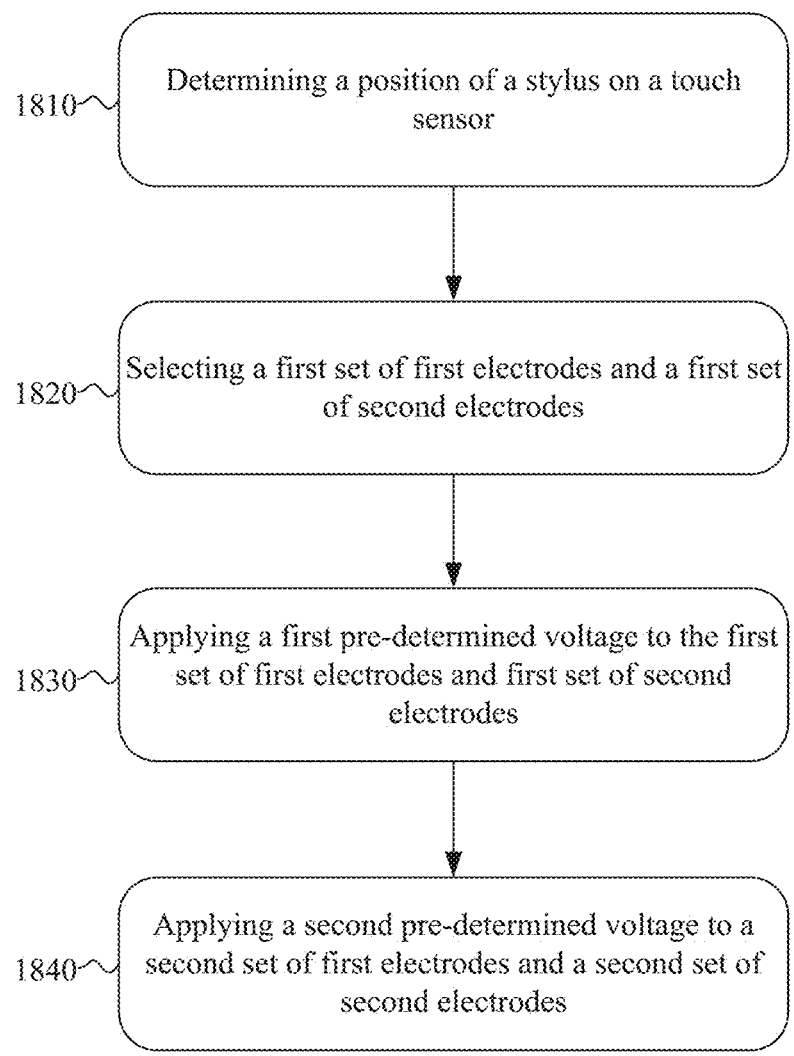
FIG. 18 illustrates an example method for synchronizing a stylus with a device in accordance with an embodiment.

FIG. 18 illustrates an example method for synchronizing a stylus with a device in accordance with an embodiment. The method 1800 starts at step 1810, where a position of a stylus on a touch sensor is determined. Step 1820 selects a first set of first electrodes (e.g., electrodes along the horizontal orientation) and a first set of the second electrodes (e.g., electrodes along the vertical orientation) are selected. In one embodiment, the selected electrodes include an overlap area formed by the selected first and second electrodes and corresponding to an area of the touch sensor in which the determined position is a location of the stylus. At step 1830, a first pre-determined voltage is simultaneously applied to the first set of electrodes. For example, the first pre-determined voltage is a series of pulse with a peak voltage of a supply voltage. Step 1840 simultaneously applies a second pre-determined voltage to a second set of first electrodes and a second set of second electrodes, at which point the method ends. For example, the second pre-determined voltage is ground of a device. In one embodiment, the second pre-determined voltage is applied while the first pre-determined voltage is being applied. Although this disclosure describes and illustrates particular steps of the method of FIG. 18 as occurring in a particular order, it is noted that the present technology is not limited to these example steps. One embodiment may repeat one or more steps of the method of FIG. 18. Moreover, although this disclosure describes and illustrates an example method for synchronizing a stylus including the particular steps of the method of FIG. 18, it is noted that the present technology is not limited to these example steps, and that other methods may be implemented, which may include all, some, or none of the steps of the method of FIG. 18. Moreover, although this disclosure describes and illustrates particular components carrying out particular steps of the method of FIG. 18, it is noted that the present technology is not limited to these example components, and that other configurations of components may be implemented.

Herein, a computer-readable non-transitory storage medium or media includes one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium is volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a processor, determining a position of an input within a touch-sensitive area of a touch sensor, the touch sensor comprising a first plurality of electrodes having a first orientation and a second plurality of electrodes having a second orientation, the second orientation being different from the first orientation;
   by the processor, selecting, based on the determined position of the input, a first set of the first plurality of electrodes and a first set of the second plurality of electrodes such that the determined position of the input is within a two-dimensional overlap area of the first set of the first plurality of electrodes with the first set of the second plurality of electrodes, the two-dimensional overlap area being smaller than the touch-sensitive area;
   applying a first pre-determined voltage to each electrode of the first set of the first plurality of electrodes and to each electrode of the first set of the second plurality of electrodes in the two-dimensional overlap area, wherein the electrodes of first set of the first plurality of electrodes are adjacent electrodes and the electrodes of first set of the second plurality of electrodes are adjacent electrodes; and
   applying, while applying the first pre-determined voltage to each electrode in the two-dimensional overlap area, a second pre-determined voltage to the touch-sensitive area outside the two-dimensional overlap area, the second pre-determined voltage being lower than the first pre-determined voltage;
   wherein the two-dimensional overlap area has a first signal state, a first portion of the touch-sensitive area outside the two-dimensional overlap area has a second signal state different than the first signal state, and a second portion of the touch-sensitive area outside the two-dimensional overlap area has a third signal state different than the first signal state and the second signal state.

2. The method of claim 1, wherein:
   a signal associated with the first pre-determined voltage comprises a synchronization signal comprising one or more pulses; and
   the second pre-determined voltage is ground.

3. The method of claim 1, wherein, when the determined position of the input is within a pre-determined distance from an edge of the touch sensor, providing a signal to the first set of the first plurality of electrodes and the first set of the second plurality of electrodes, wherein the first set of the first plurality of electrodes comprises an outermost electrode and a pre-determined number of contiguous electrodes positioned in sequence with the outermost electrode.

4. The method of claim 1, wherein:
the first set of the first plurality of electrodes and the first set of the second plurality of electrodes comprise electrodes located within an interior area of the touch sensor; and
the method further comprises, in response to determining the input moved within a pre-determined distance from a first outermost electrode, selecting a second set of the first plurality electrodes and a second set of the second plurality of electrodes such that the second set of the first plurality of electrodes comprise the first outermost electrode and the second set of the second plurality of electrodes comprise a second outermost electrode.

5. The method of claim 4, further comprising:
applying a signal comprising the first pre-determined voltage to a third set of the first plurality of electrodes and a third set of the second plurality of electrodes; and
applying, while applying the signal to the third set of the first plurality of electrodes and the third set of the second plurality of electrodes, the second pre-determined voltage to a fourth set of the first plurality of electrodes and a fourth set of the second plurality of electrodes.

6. The method of claim 1, further comprising:
determining an updated position of the input based on a velocity of the input; and
selecting a second set of the first plurality electrodes and a second set of the second plurality of electrodes such that a location of an overlap of the second set of the first plurality of electrodes with the second set of the second plurality of electrodes is based on the updated position of the input.

7. The method of claim 1, further comprising:
selecting, based on the determined position of the input, a third set of the first plurality electrodes and a third set of the second plurality of electrodes such that the third set of the first plurality of electrodes and the third set of the second plurality of electrodes comprise a pre-determined number of contiguous electrodes adjacent to one or more outermost electrodes of the overlap of the first set of the first plurality of electrodes with the first set of the second plurality of electrodes;
applying a first signal comprising the first pre-determined voltage to the first set of the first plurality of electrodes and the first set of the second plurality of electrodes;
applying, while applying the first signal to the first set of the first plurality of electrodes and the first set of the second plurality of electrodes, the second pre-determined voltage to a second set of the first plurality of electrodes and a second set of the second plurality of electrodes; and
applying, while applying the first signal to the first set of the first plurality of electrodes and the first set of the second plurality of electrodes, a second signal comprising a third pre-determined voltage to the third set of the first plurality of electrodes and the third set of the second plurality of electrodes, wherein the second signal is inverted relative to the first signal.

8. A controller comprising: a processor; and a memory coupled to the processor, the memory storing logic configured to cause the processor as a result of being by executed the processor, to:

determine a position of an input within a touch-sensitive area of a touch sensor, the touch sensor comprising a first plurality of electrodes having a first orientation and a second plurality of electrodes having a second orientation, the second orientation being different from the first orientation; select,
based on the determined position of the input, a first set of the first plurality electrodes and a first set of the second plurality of electrodes such that the determined position of the stylus is within a two-dimensional overlap area of the first set of the first plurality of electrodes with the first set of the second plurality of electrodes, the two-dimensional overlap area corresponding to an area of the touch sensor in which the determined position is located, the two-dimensional overlap area being smaller than the touch-sensitive area;
apply a first pre-determined voltage to each electrode of the first set of the first plurality of electrodes and to each electrode of the first set of the second plurality of electrodes in the two-dimensional overlap area, wherein the electrodes of first set of the first plurality of electrodes are adjacent electrodes and the electrodes of first set of the second plurality of electrodes are adjacent electrodes; and
apply, while applying the first pre-determined voltage to each electrode in the two-dimensional overlap area, a second pre-determined voltage to the touch-sensitive area outside the two-dimensional overlap area, the second pre-determined voltage being lower than the first pre-determined voltage; wherein the two-dimensional overlap area has a first signal state, a first portion of the touch-sensitive area outside the two-dimensional overlap area has a second signal state different than the first signal state, and a second portion of the touch-sensitive area outside the two-dimensional overlap area has a third signal state different than the first signal state and the second signal state.

9. The controller of claim 8, wherein:
a signal associated with the first pre-determined voltage comprises a synchronization signal comprising one or more pulses; and
the second pre-determined voltage is ground.

10. The controller of claim 8, wherein the logic is further configured to, when the determined position of the input is within a pre-determined distance from an edge of the touch sensor, provide a signal comprising the first pre-determined voltage to the first set of the first plurality of electrodes and the first set of the second plurality of electrodes, wherein the first set of the first plurality of electrodes comprises an outermost electrode and a pre-determined number of contiguous electrodes positioned in sequence with the outermost electrode.

11. The controller of claim 8, wherein:
the first set of the first plurality of electrodes and the first set of the second plurality of electrodes comprise electrodes located within an interior area of the touch sensor; and
the processor is further configured to, in response to the determined the input moved within a pre-determined distance from a first outermost electrode, select a third set of the first plurality electrodes and a third set of the second plurality of electrodes such that the third set of the first plurality of electrodes comprise the first outermost electrode and the third set of the second plurality of electrodes comprise a second outermost electrode.

12. The controller of claim 11, wherein the processor is further configured to:
apply a signal comprising the first pre-determined voltage to the third set of the first plurality of electrodes and the third set of the second plurality of electrodes; and
apply, while applying the signal to the third set of the first plurality of electrodes and the third set of the second plurality of electrodes, the second pre-determined voltage to a fourth set of the first plurality of electrodes and a fourth set of the second plurality of electrodes.

13. The controller of claim 8, wherein the processor is further configured to:
select, based on the determined position of the input, a third set of the first plurality electrodes and a third set of the second plurality of electrodes such that the third set of the first plurality of electrodes and the third set of the second plurality of electrodes comprise a pre-determined number of contiguous electrodes adjacent to one or more outermost electrodes of the overlap of the first set of the first plurality of electrodes with the first set of the second plurality of electrodes;
apply a first signal comprising the first pre-determined voltage to the first set of the first plurality of electrodes and the first set of the second plurality of electrodes;
apply, while applying the first signal to the first set of the first plurality of electrodes and the first set of the second plurality of electrodes, the second pre-determined voltage to a second set of the first plurality of electrodes and a second set of the second plurality of electrodes; and
apply, while applying the first signal to the first set of the first plurality of electrodes and the first set of the second plurality of electrodes, a second signal comprising a third pre-determined voltage to the third set of the first plurality of electrodes and the third set of the second plurality of electrodes, wherein the second signal is inverted relative to the first signal.

14. The controller of claim 8, wherein the processor is further configured to:
determine an updated position of the input based on a velocity of the input; and
select a second set of the first plurality electrodes and a second set of the second plurality of electrodes such that a location of an overlap of the second set of the first plurality of electrodes with the second set of the second plurality of electrodes is based on the updated position of the input.

15. A system comprising:
a touch sensor comprising a first plurality of electrodes having a first orientation and a second plurality of electrodes having a second orientation, the second orientation being different from the first orientation; and a controller coupled to the touch sensor, the controller comprising:
a processor; and a memory coupled to the processor, the memory storing logic configured to cause the processor as a result of being by executed the processor, to:
determine a position of an input within a touch-sensitive area of the touch sensor; select, based on the determined position of the input, a first set of the first plurality electrodes and a first set of the second plurality of electrodes such that the determined position of the stylus is within a two-dimensional overlap of the first set of the first plurality of electrodes with the first set of the second plurality of electrodes, an area of the two-dimensional overlap being smaller than the touch-sensitive area;
apply a first pre-determined voltage to each electrode of the first set of the first plurality of electrodes and to each electrode of the first set of the second plurality of electrodes in the two-dimensional overlap area, wherein the electrodes of first set of the first plurality of electrodes are adjacent electrodes and the electrodes of first set of the second plurality of electrodes are adjacent electrodes; and
apply, while applying the first pre-determined voltage to each electrode in the two-dimensional overlap area, a second pre-determined voltage to the touch-sensitive area outside the two-dimensional overlap area, the second pre-determined voltage being lower than the first pre-determined voltage;
wherein the two-dimensional overlap area has a first signal state, a first portion of the touch-sensitive area outside the two-dimensional overlap area has a second signal state different than the first signal state, and a second portion of the touch-sensitive area outside the two-dimensional overlap area has a third signal state different than the first signal state and the second signal state.

16. The system of claim 15, wherein:
a signal associated with the first pre-determined voltage comprises a synchronization signal comprising one or more pulses; and
the second pre-determined voltage is ground.

17. The system of claim 15, wherein the processor is further configured to, when the determined position of the input is within a pre-determined distance from an edge of the touch sensor, provide a signal comprising the first pre-determined voltage to the first set of the first plurality of electrodes and the first set of the second plurality of electrodes, wherein the first set of the first plurality of electrodes comprises an outermost electrode and a pre-determined number of contiguous electrodes positioned in sequence with the outermost electrode.

* * * * *